US012633791B2

(12) United States Patent
Luna Acevedo et al.

(10) Patent No.: US 12,633,791 B2
(45) Date of Patent: May 19, 2026

(54) ELECTRIC MACHINE COIL CONFIGURATION AND ELECTRIC MACHINES HAVING THE SAME

(71) Applicant: General Electric Deutschland Holding GmbH, Frankfurt (DE)

(72) Inventors: Israel Luna Acevedo, Munich (DE); Mohamed Osama, Garching (DE)

(73) Assignee: General Electric Deutschland Holding GMBH, Frankfurt (DE)

( * ) Notice: Subject to any disclaimer, the term of this patent is extended or adjusted under 35 U.S.C. 154(b) by 190 days.

(21) Appl. No.: 18/509,569

(22) Filed: Nov. 15, 2023

(65) Prior Publication Data

US 2025/0158468 A1      May 15, 2025

(51) Int. Cl.
| | |
|---|---|
| *H02K 3/12* | (2006.01) |
| *H02K 1/16* | (2006.01) |
| *H02K 3/48* | (2006.01) |
| *H02K 15/062* | (2025.01) |

(52) U.S. Cl.
CPC ................. *H02K 3/12* (2013.01); *H02K 1/16* (2013.01); *H02K 3/48* (2013.01); *H02K 15/062* (2013.01)

(58) Field of Classification Search
CPC ........................... H02K 3/18; H02K 3/52–525
USPC ........................................................ 310/208
See application file for complete search history.

(56) References Cited

U.S. PATENT DOCUMENTS

| | | | |
|---|---|---|---|
| 3,937,180 | A | 2/1976 | Wiggins |
| 4,013,615 | A | 3/1977 | Ohashi et al. |
| 5,316,801 | A | 5/1994 | Hopeck |
| 5,318,801 | A | 6/1994 | Snail et al. |
| D452,220 | S | 12/2001 | Robson |
| 6,778,053 | B1 | 8/2004 | Irwin et al. |
| 7,003,867 | B2 | 2/2006 | Yamamoto et al. |

(Continued)

FOREIGN PATENT DOCUMENTS

| | | |
|---|---|---|
| CN | 212277995 | 1/2021 |
| EP | 3783629 | 2/2021 |

(Continued)

OTHER PUBLICATIONS

Machine translation of IL-229458-A (Year: 2018).*

(Continued)

*Primary Examiner* — Oluseye Iwarere
*Assistant Examiner* — Minki Chang
(74) *Attorney, Agent, or Firm* — Smith, Gambrell & Russell, LLP

(57) ABSTRACT

An electric machine configured to convey electromechanical energy, such as through the conversion between electrical power and mechanical power, includes a slot into which is disposed a coil. The slot can be a stator slot having a trapezoidal cross-sectional shape. The coil can have a plurality of turns that, in cross-section, also includes a trapezoidal shape. The turns can be stacked upon each other in a radial direction between the proximal end and the distal end of the stator slot, each turn of the coil having a different cross-sectional area and a different radial height relative to an adjacent turn of the coil. Additionally and/or alternatively, each turn of the coil, except for the turn of the coil located at the distal end of the stator slot, includes a reduced radial height relative to a turn of the coil that is located radially outward from each turn of the coil.

19 Claims, 13 Drawing Sheets

(56) References Cited

U.S. PATENT DOCUMENTS

| | | | |
|---|---|---|---|
| 7,227,290 | B2 | 6/2007 | Yamamoto et al. |
| 7,239,063 | B2 | 7/2007 | Yamamoto et al. |
| 7,569,969 | B2 | 8/2009 | Nakano et al. |
| 7,572,488 | B2 | 8/2009 | Huehsam |
| 7,670,653 | B2 | 3/2010 | Kaufhold et al. |
| 8,795,762 | B2 | 8/2014 | Fulton et al. |
| 9,825,498 | B2 | 11/2017 | Odani et al. |
| 10,673,293 | B2 | 6/2020 | Lee |
| 10,923,240 | B2 | 2/2021 | Sochor et al. |
| 2010/0026132 | A1* | 2/2010 | Ooiwa ..................... H02K 3/12 310/201 |
| 2017/0353083 | A1* | 12/2017 | Shrestha .............. H02K 11/215 |
| 2021/0175763 | A1* | 6/2021 | Kim ......................... H02K 1/16 |
| 2021/0346944 | A1 | 11/2021 | Busse et al. |
| 2023/0155463 | A1* | 5/2023 | Li .......................... H02K 1/148 29/732 |
| 2024/0006935 | A1* | 1/2024 | Blanchard St-Jacques ................ H02K 3/12 |

FOREIGN PATENT DOCUMENTS

| | | | |
|---|---|---|---|
| EP | 3573216 | 5/2023 | |
| IL | 229458 A * | 11/2018 | ............. H02K 31/00 |
| WO | WO2010023117 A1 | 3/2010 | |
| WO | WO2018089528 | 5/2018 | |
| WO | WO2022239627 | 11/2022 | |

OTHER PUBLICATIONS

Co-Pending U.S. Appl. No. 18/095,580, filed Jan. 11, 2023.

Ayat et al., Design of Shaped-Profile Electrical Machine Windings for Multi-Material Additive Manufacture, 2020 International Conference on Electrical Machines (ICEM), Aug. 23-26, 2020, 1554-1559. (Abstract Only) https://doi.org/10.1109/ICEM49940.2020. 9270945.

Busse et al., Cast Coils, Fraunhofer IF AM, Fraunhofer Institute for Manufacturing Technology and Advanced Materials IFAM, Germany, 2 Pages. Retrieved May 23, 2023 from Webpage: https://www.ifam.fraunhofer.de/content/dam/ifam/en/documents/Shaping_Functional_Materials/casting_technology/cast_coils_fraunhofer_ifam.pdf.

Chin et al., Design of PMSM for EV Traction Using MSO Coil Considering AC Resistance According to Current Density and Parallel Circuit, 2019 IEEE Vehicle and Propulsion Conference (VPPC) Hanoi, Vietnam, 2019, 1-6. (Abstract Only) https://ieeexplore. ieee.org/document/8952259.

Gröninger et al., Casting Production of Coils for Electrical Machines, 2011 1st International Electric Drives Production Conference, Sep. 2011, Nuremberg, Germany, 159-161. (Abstract Only) https://doi.org/10.1109/EDPC.2011.6085534.

Hemmati et al., Survey of Insulation Systems in Electrical Machines, 2019 IEEE International Electric Machines & Drives Conference (IEMDC), May 12-15, 2019, San Diego, CA, 2069-2076. (Abstract Only) https://doi.org/10.1109/IEMDC.2019.8785099.

Lammeraner et al., Eddy Currents, Book, ISBN: 9780592050164, 1966, 233 Pages.

Linnermann et al., Resource-Efficient, Innovative Coil Production for Increased Filling Factor, 2019 9th International Electric Drives Production Conference (EDPC), Esslingen, Germany, 2019, 1-5. (Abstract Only) https://ieeexplore.ieee.org/document/9012063.

Silbernagel, Investigation of the Design, Manufacture and Testing of Additively Manufactured Coils for Electric Motor Applications, Ph.D. Thesis, University of Nottingham, Jun. 2019, 250 Pages. http://eprints.nottingham.ac.uk/57090/1/PhD%20Thesis%20%Cassidy%20Silbernagel%202019%20Final.pdf.

Simpson et al., Additive Manufacturing of a Conformal Hybrid-Strand Concentrated Winding Topology for Minimal AC Loss in Electrical Machines, 2021 IEEE Energy Conversion Congress and Exposition (ECCE), Vancouver, BC, Canada, Oct. 10-14, 2021, 3844-3851. https://doi.org/10.1109/ECCE47101.2021.9595059.

Simpson et al., Additive Manufacturing of Shaped Profile Windings for Minimal AC Loss in Gapped Inductors, 2017 IEEE International Electric Machines and Drives Conference (IEMDC), Miami, FL, 2017, 1-7. (Abstract Only) https://doi.org/10.1109/IEMDC.2017. 8002337.

Wienhausen, High Integration of Power Electronic Converters Enabled by 3D Printing, Power Electronics and Electrical Drives (ISEA), PhD Thesis, RWTH Aachen University, 2019, 164. https://doi.org/10.18154/RWTH-2019-08746.

Yi et al., Equivalent Thermal Conductivity Prediction of Form-Wound Windings with Litz Wire Including Transposition Effects, IEEE Transactions on Industry Applications, vol. 57, Issue 2, Mar.-Apr. 2021, 1440-1449. (Abstract Only) https://doi.org/10.1109/TIA.2021.3053500.

Zhang, Winding Losses in High-Speed Machines Using Form-Wound Windings, Ph.D. Thesis University of Wisconsin-Madison, 2015, 24 pages. https://www.proquest.com/openview/7efSe4cfce2ece81836e4b717274bc6f/1?pq-origsite=gscholar&cbl=18750.

Extended European Search Report for European Patent Application No. 24207392.2, Mar. 28, 2025 (17 pages).

Anonymous, Why High-Speed Machines?| Aalto University, Jun. 21, 2022; 8 pages, XP093261809; retrieved from the Internet: https://www.aalto.fi/en/the-hiecss-centre-of-excellence/why-high-speed-machines-0.

Anonymous, "Electrical Insulation Paper—Wikipedia", Sep. 23, 2022; 3 pages, XP093261851; retrieved from the Internet: https://web.archive.org/web/20220923105516/https://en.wikipedia.org/wiki/Electrical_insulation_paper.

Anonymous, "Enamel Coating Magnet Wire | Poly Amide-Imide | Polyimide", Jul. 6, 2023; 2 pages, XP093261857; retrieved from the Internet: https://web.archive.org/web/20230706135735/https://www.swwireco.com/enamel-coated-magnet-wire.hmtl.

* cited by examiner

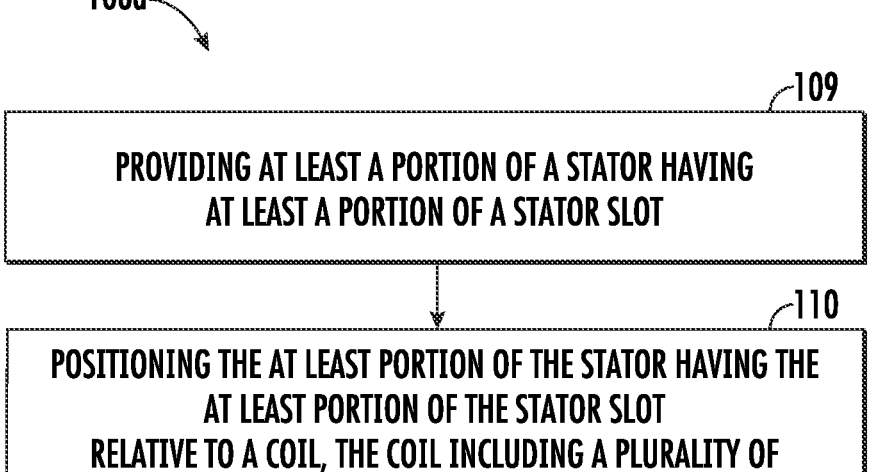

108a

109

PROVIDING AT LEAST A PORTION OF A STATOR HAVING
AT LEAST A PORTION OF A STATOR SLOT

110

POSITIONING THE AT LEAST PORTION OF THE STATOR HAVING THE
AT LEAST PORTION OF THE STATOR SLOT
RELATIVE TO A COIL, THE COIL INCLUDING A PLURALITY OF
TURNS STACKED UPON EACH OTHER IN A RADIAL DIRECTION BETWEEN
A BOTTOM AND A TOP OF THE STATOR SLOT, EACH TURN OF THE COIL
HAVING A DIFFERENT CROSS-SECTIONAL AREA AND A DIFFERENT
RADIAL HEIGHT RELATIVE TO AN ADJACENT TURN OF THE COIL

FIG. 14A

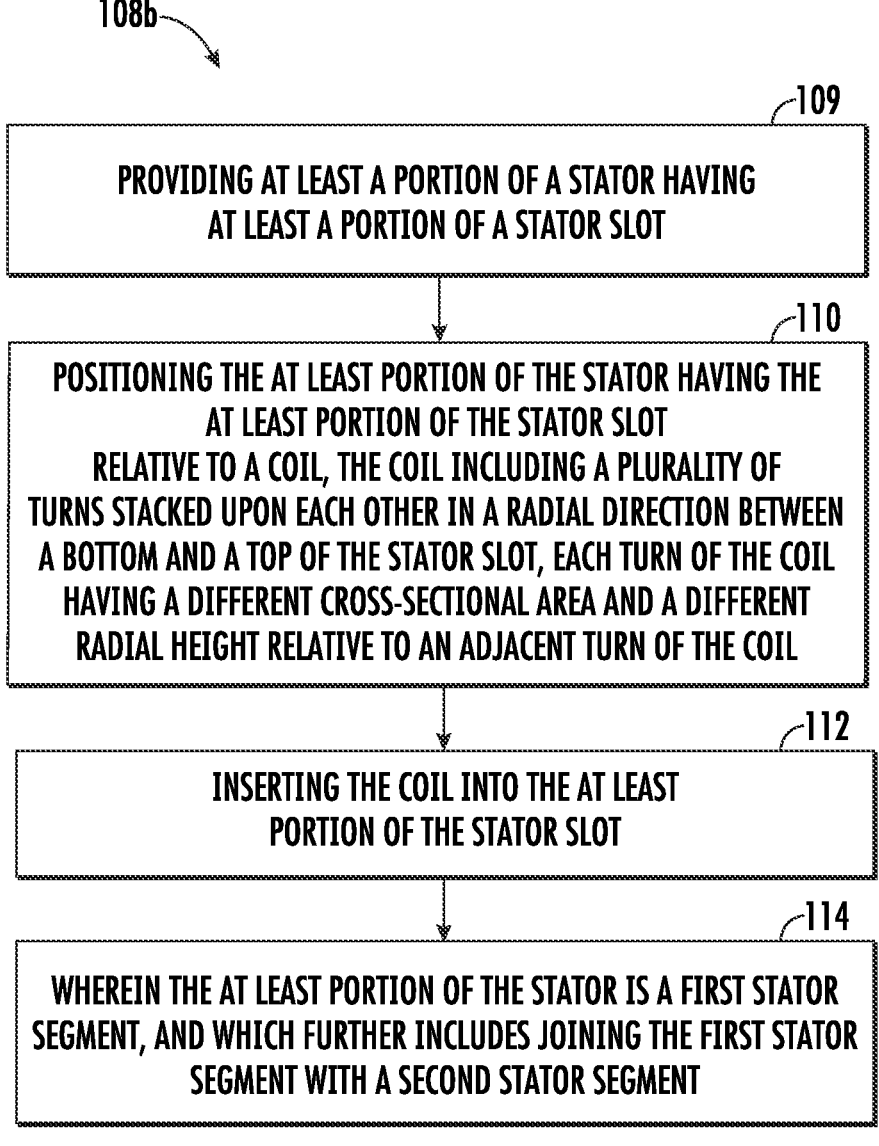

108b

109

PROVIDING AT LEAST A PORTION OF A STATOR HAVING
AT LEAST A PORTION OF A STATOR SLOT

110

POSITIONING THE AT LEAST PORTION OF THE STATOR HAVING THE
AT LEAST PORTION OF THE STATOR SLOT
RELATIVE TO A COIL, THE COIL INCLUDING A PLURALITY OF
TURNS STACKED UPON EACH OTHER IN A RADIAL DIRECTION BETWEEN
A BOTTOM AND A TOP OF THE STATOR SLOT, EACH TURN OF THE COIL
HAVING A DIFFERENT CROSS-SECTIONAL AREA AND A DIFFERENT
RADIAL HEIGHT RELATIVE TO AN ADJACENT TURN OF THE COIL

112

INSERTING THE COIL INTO THE AT LEAST
PORTION OF THE STATOR SLOT

114

WHEREIN THE AT LEAST PORTION OF THE STATOR IS A FIRST STATOR
SEGMENT, AND WHICH FURTHER INCLUDES JOINING THE FIRST STATOR
SEGMENT WITH A SECOND STATOR SEGMENT

FIG. 14B

ELECTRIC MACHINE COIL CONFIGURATION AND ELECTRIC MACHINES HAVING THE SAME

FIELD

The present disclosure relates to electric machines such as, for example, generators and motors.

BACKGROUND

Electric machines are used for a wide variety of applications, such as automotive applications, aerospace applications, industrial applications, and/or the like. Electric machines generally include a rotor and a stator, and can take on a variety of forms including an electric motor or electric generator. The electric motor, in general, is used to convert electrical energy to mechanical energy, or mechanical energy to electrical energy.

No matter the type, electric machines include several constituent parts, including rotors and stators. Electric machines also include field devices such as coils which typically include several turns of a conductive material. Improvements to the configuration of coils and operation of the electric motors would be useful in the art.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which:

FIG. 14a is a depiction of a method of building an electric machine in accordance with another exemplary embodiment of the present disclosure.

FIG. 14b is a depiction of a method of building an electric machine in accordance with another exemplary embodiment of the present disclosure.

DETAILED DESCRIPTION

Figure 1A:
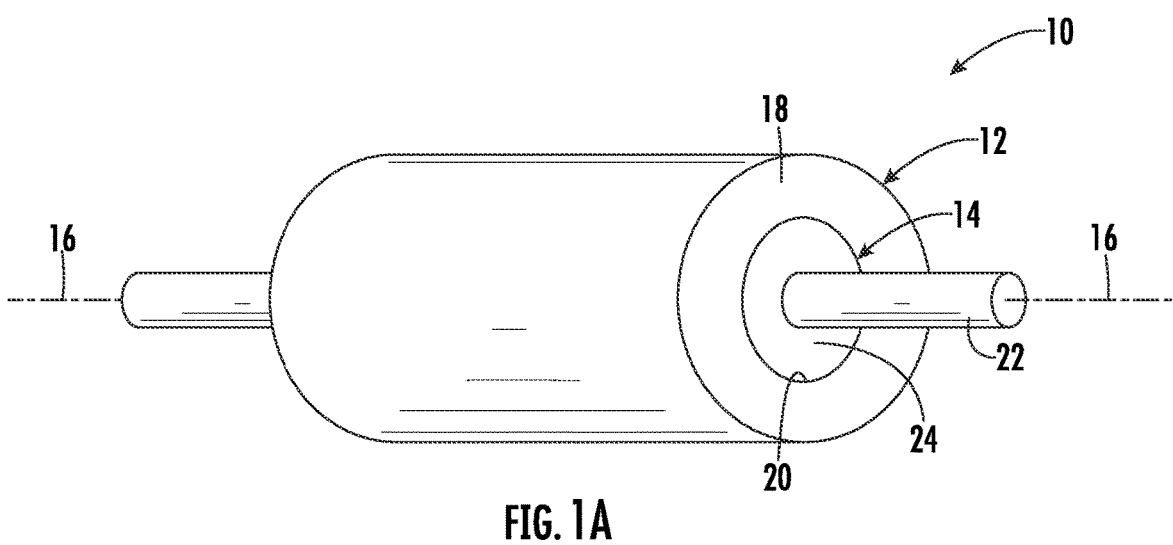
FIG. 1A is an embodiment of an electric machine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "gas turbine engine" refers to an engine having a turbomachine as all or a portion of its power source. Example gas turbine engines include gas turbine engines, turboprop engines, turbojet engines, turboshaft engines, etc., as well as hybrid-electric versions of one or more of these engines.

The terms "axial" and "axially" refer to directions and orientations that extend substantially parallel to a reference axis. Moreover, the terms "radial" and "radially" refer to directions and orientations that extend substantially perpendicular to the reference axis. In addition, as used herein, the terms "circumferential" and "circumferentially" refer to directions and orientations that extend arcuately about the reference axis.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

The present disclosure is generally related to electric machines that have improved performance in light of unique coil configuration, and in particular unique turn configuration disposed in a slot of the electric machine. The coil includes a plurality of turns stacked upon each other in a radial direction between a proximal end and a distal end of the stator slot, each turn of the coil having a different cross-sectional area and a different radial height relative to an adjacent turn of the coil. The turns can be solid conductors in which a single turn occupies a given radial space. The coil can alternatively and/or additional have each turn of the coil, except for the turn of the coil located at the distal end of the stator slot, include a reduced radial height relative to a turn of the coil that is located radially outward from each turn of the coil. An unexpected relationship of the turns was discovered that, for each turn of the plurality of turns, $$r_{nt} = \frac{h_t}{h_c} \le \frac{0.75}{n},$$

where $r_{nt}$ is a limiting ratio, $h_t$ is the height of the $n^{th}$ turn of the coil, $h_c$ is the height of the coil, and n is the coil number being evaluated in the equation.

Figure 1B:
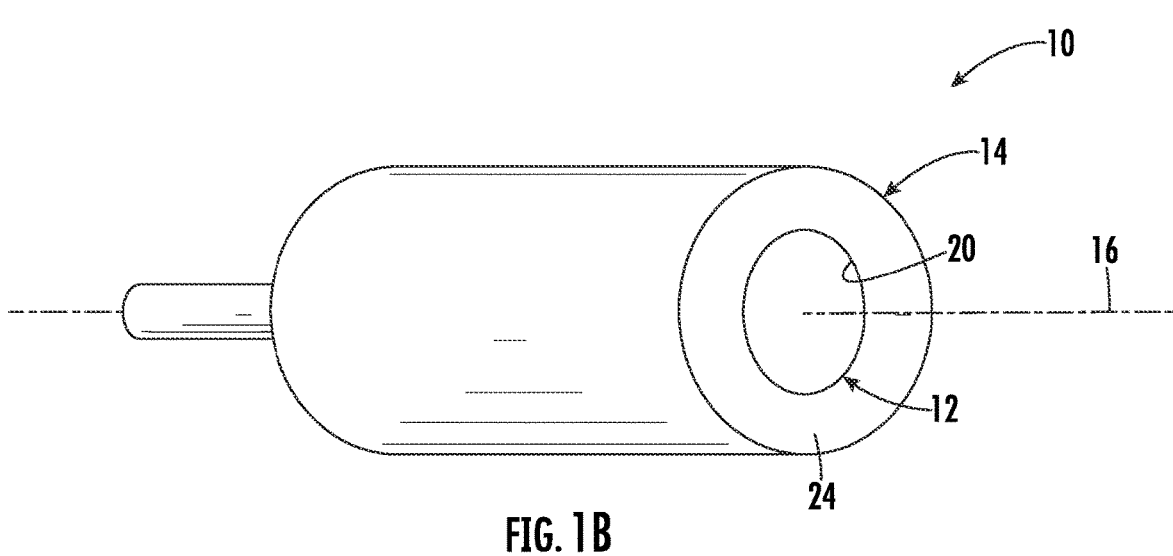
FIG. 1B is an embodiment of an electric machine in accordance with an exemplary aspect of the present disclosure.

Referring now to the drawings, wherein identical numerals indicate the same elements throughout the figures, FIG. 1A is a perspective view of an embodiment of an electric machine 10. The electric machine 10 includes a stator 12 and a rotor 14, both of which are concentrically aligned about a central longitudinal axis 16 of the electric machine 10. The rotor 14 of FIG. 1A is positioned radially inward from the stator 12. FIG. 1B depicts a variation of the electric machine 10 in FIG. 1A. Whereas the electric machine of FIG. 1A includes a rotor 14 positioned radially inward from the stator 12, the embodiment of FIG. 1B includes the rotor 14 positioned radially outward from the stator 12. As in the embodiment of FIG. 1A, the stator 12 and rotor 14 of the embodiment in FIG. 1B are concentrically aligned about the central longitudinal axis 16.

Whether of the embodiment in FIG. 1A or FIG. 1B, the stator 12 and rotor 14 are electromagnetically coupled with one another during operation of the electric machine 10, and generally function together as an electromechanical energy converter. The rotor 14 is configured to rotate relative to the stator 12 during operation of the electric machine 10. The electric machine 10 can be an electrical motor, wherein the rotor 14 rotates relative to the stator 12 to convert electrical energy to mechanical energy. Alternatively, the electric machine can be an electrical generator, wherein the relative rotation between the rotor 14 and the stator 12 converts mechanical energy to electrical energy. Whether operating as an electric generator or an electric motor, it is contemplated that the electric machine 10 can be coupled with a variety of vehicles and machines, including, for example, an aircraft, land vehicles such as cars and trucks, locomotives, and watercraft. In one specific example, the electric machine 10 can be coupled with a gas turbine engine used as a powerplant for an aircraft. It is envisioned that the electric machine 10 in this embodiment can be coupled with a shaft of the gas turbine engine (e.g. either a low pressure, intermediate pressure, or high pressure shaft) to function a motor and/or a generator.

The electric machine 10 of the embodiments described herein may be any type of rotating electric machine, such as, but not limited to, a synchronous machine, a multi-phase electric machine, an electric machine with concentrated windings, an electric machine with distributed windings, a reluctance machine, an induction machine, a wound field machine, a salient pole electric machine, an internal permanent magnet (IPM) machine, an electric machine with permanent magnets arranged differently than an IPM machine (e.g., surface PM machines and/or the like), and/or the like. Further, the electric machine 10 of the embodiments described herein can be permanent magnet machines, wound-field synchronous machines, induction (asynchronous) machines, synchronous reluctance machines, and switched reluctance machines.

The stator 12 extends a length along the central longitudinal axis 16. The stator 12 includes a stator core 18 having a central opening 20 that extends along the central longitudinal axis 16. The rotor 14 extends a length along the central longitudinal axis 16 and generally is positioned within the central opening 20 and radially inward of the stator 12. The rotor 14 includes a rotor core 24 that can be coupled to a shaft 22. The shaft 22 is configured to rotate with the rotor core 24 about the central longitudinal axis 16 relative to the stator core 18. The rotor core 24 can be mounted to the shaft 22 such that the rotor core 24 is configured to rotate about the central longitudinal axis 16 with the shaft 22. In an alternative embodiment, the rotor 14 can be configured to extend around the stator 12 such that the rotor assembly is configured to rotate radially outside of and around the stator 12.

Figure 2:
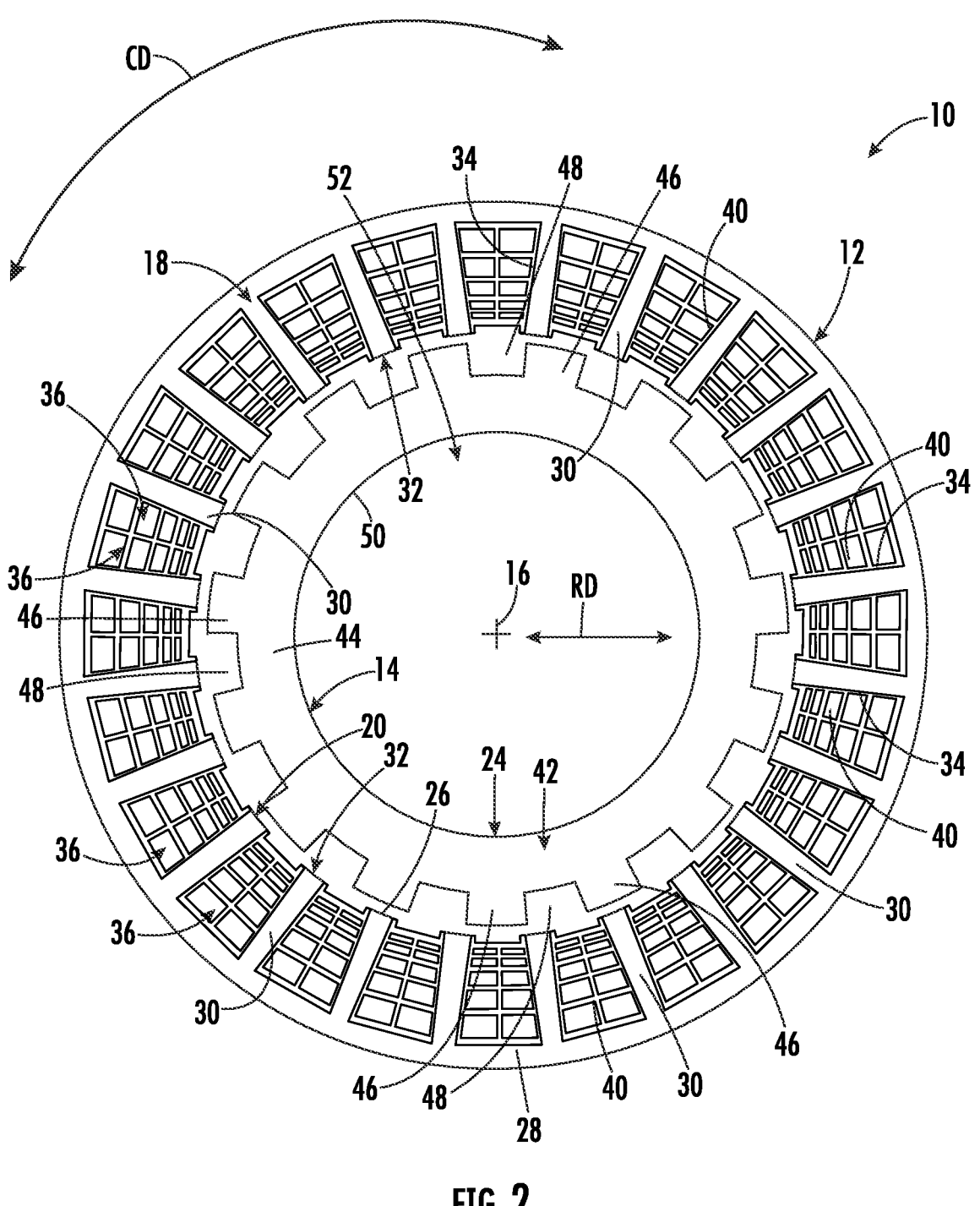
FIG. 2 is an embodiment of an electric machine in accordance with another exemplary embodiment of the present disclosure.

FIG. 2 is a cross-sectional view of an embodiment of the electric machine 10 in which the stator 12 and rotor 14 extend in a circumferential direction CD about the central longitudinal axis 16. The stator 12 is offset from the rotor 14 in a radial direction RD, in particular a radially outward direction, from the central longitudinal axis 16. In the illustrated embodiment, the stator core 18 includes a stator base 28 and a plurality of stator teeth 30 that extend radially between the stator base 28 and ends 32 of the stator teeth 30. In the illustrated embodiment of the stator 12, the stator teeth 30 extend radially inward from the stator base 28.

As can be seen in FIG. 2, the stator teeth 30 are arranged radially about the central longitudinal axis 16 such that the stator teeth 30 are circumferentially spaced apart from each other. The stator core 18 includes stator slots 34 positioned between adjacent stator teeth 30 and radially inward from the stator base 28 toward the stator teeth. In some alternative embodiments, the ends 32 of adjacent stator teeth 30 are connected together, or include portions that extend toward one another so as to form an opening smaller in size than a width of the slots 34. It is contemplated that the stator slot is trapezoidal in cross-sectional shape, the details of which are better illustrated in further embodiments below. Other embodiments, however, can include a stator slot 34 that is rectangular in shape. Also, as will be described further below, the stator can be a segmented stator in some embodiments.

Figures 3, 4:
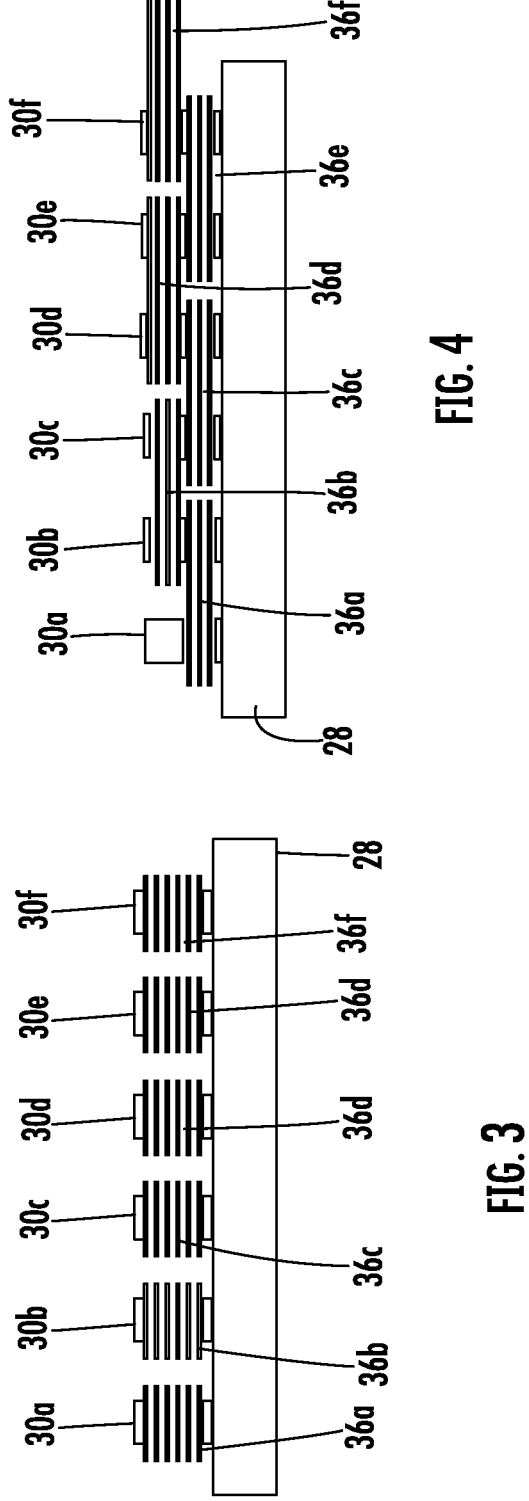
FIG. 3 is an embodiment of an electric machine having coils in a concentrated winding arrangement in accordance with an exemplary embodiment of the present disclosure.
FIG. 4 is an embodiment of an electric machine having coils in a distributed winding arrangement in accordance with another exemplary embodiment of the present disclosure.

The stator 12 also includes field coils 36 having windings disposed in the stator slots 34 between stator teeth 30. The field coils can be configured such that the windings extend between opposing axial ends of the stator 12 and wrap around respective stator teeth 30 so as to place a portion of the windings in separate stator slots 34. Each coil 36 may be, or represent, any number of phases, such as, but not limited to, a single phase or three phases. The windings of the field coils 36 can be configured in a number of arrangements, including concentrated winding arrangements, an example of which is shown in FIG. 3, and distributed winding arrangements, an example of which is shown in FIG. 4. Thus, the description herein is applicable to a variety of winding arrangements. FIG. 3 illustrates coils 36a-36f wrapped around respective stator tooth 30a-30f, such that the winding of the respective coils 36a-36f are located in stator slots 34 located on opposite sides of a given stator tooth 30. FIG. 4 illustrates coils 36a-36f wrapped around neighboring stator teeth 30, such that the respective coils 36a-36f bridge over, but do not extend into, a stator slot 34 located between the neighboring stator teeth 30.

Returning to the embodiment depicted in FIG. 2, the coils 36 can be made using any number manufacturing techniques and can be made from a variety of conductive materials. In one form, the coils 36 are made from a variety of metals or metal alloys, including copper, aluminum, or other alternative metal alloys (e.g., brass alloys, iron alloys, etc.). The metal or metal alloy material can have a variety of metal conductivity values. In one form, electrical conductivity of the material for coils 36 is 0.3-1.0 pu of International Annealed Copper Standard (IACS) copper at room temperature. As is well known, 1 pu=$5.8001 \times 10^7$ Siemens/meter. The coils 36 can furthermore be manufactured using any number of techniques including additive manufacturing, casting, and machining.

The stator core 18 may include any number of stator teeth 30 and any number of stator slots 34. In the illustrated embodiment of the stator 12, the stator core 18 includes twenty-four stator teeth 30 and twenty-four stator slots 34. The stator core; 18 may include any number of coils 36 and can be configured to operate with any number of phases.

The stator 12 can includes ground insulation 40 positioned within the stator slots 34 to electrically isolate the coils 36 from the stator core 18. Other insulation can also be used to separate turns of the coil 36, as will be discussed and illustrated below in further additional and/or alternative embodiments.

The rotor core 24 includes a body 42 that axially extends along the central longitudinal axis 16 and is configured to rotate relative to the stator 12 about the central longitudinal axis 16. In the illustrated embodiment of the rotor 14, the body 42 includes a rotor base 44, a plurality of magnetic segments 46 that extend in the radial direction from the rotor base 44, and a plurality of non-magnetic segments 48 that extend in the radially direction from the rotor base 44. Though in the illustrated embodiment the magnetic segments 46 and non-magnetic segments 48 extend radially inward from the rotor base 44, in some alternative embodiments, the segments 46 and 48 may extend radially inward from the rotor base 44.

The magnetic segments 46 and the non-magnetic segments 48 are arranged in an alternating pattern in the circumferential direction such that the magnetic segments 46 are spaced apart from each other with the non-magnetic segments 48 extending between adjacent magnetic segments 46. In the illustrated embodiment of the rotor 14, the rotor 14 can be considered a toothed rotor wherein the magnetic segments 46 define rotor teeth of the rotor core 24.

An air gap extends between the circumference of the rotor core 24 and the radially inner surface 26 of the stator core 18. In the illustrated embodiment, the rotor base 44 of the rotor core body 42 includes a radially inner surface 50 that defines a central opening 52 of the rotor core 24. The rotor base 44 may include one or more mortices (not shown) that are configured to receive corresponding tenons (not shown) of the shaft 22 therein for mounting the rotor core body 42 to the shaft 22. Other arrangements for mounting the rotor core body 42 to the shaft 22 may be provided in addition or alternative to the mortices and tenons.

The body 42 of the rotor core 24 may be formed from one or more stacks of a plurality of laminations. As an alternative to using one or more stacks of laminations, the rotor core body 42 may be formed as a single piece of material. The rotor base 44 of the rotor core body 42 may be integrally formed with the magnetic segments 46 and/or the non-magnetic segments 48. For example, when the body 42 of the rotor core 24 is formed from a stack of laminations, the rotor base 44 of each lamination, or layer, within the stack may be integrally formed with the magnetic segments 46 and/or the non-magnetic segments 44 of the lamination. Moreover, and for example, in embodiments wherein the rotor core body 42 is formed as a single piece of material, the rotor base 44 is a single piece of material that is integrally formed with all of the magnetic segments 46 and non-magnetic segments 48 of the rotor core 24. In the illustrated embodiment of the rotor 14, the magnetic segments magnetically communicate with the rotor base 44 such that the rotor 14 is a toothed rotor. In other words, the rotor base 44 carries magnetic flux. The toothed rotor structure of the rotor 14, whether constructed of a stack of laminations or a single piece of material, distinguishes the rotor 14 from a "segmented" rotor 14 that includes a rotor core having magnetic segments that are magnetically isolated, or segmented, from the rotor base and each other. As in the illustrated embodiment of the electric machine 10, the stator 12 and/or the rotor 14 may or may not include a permanent magnet. In some alternative embodiments, the rotor 14 is a segmented rotor.

The rotor core 24 may include any number of magnetic segments 46 and/or non-magnetic segments 48. For example, the rotor core 24 may include any number of rotor teeth 30. The rotor core 24 may include the same number of rotor teeth 30 as the number of stator teeth 30 that the stator core 18 includes. Alternatively, the stator core 18 may include a greater or a lesser number of stator teeth 30 than the number of rotor teeth 30 that the rotor core 24 includes. In the illustrated embodiment of the electric machine 10, the rotor core 24 includes fourteen rotor teeth 30, such that the illustrated embodiment of the electrical machine 10 includes a greater number of stator teeth 30 than rotor teeth 30.

Figure 5:
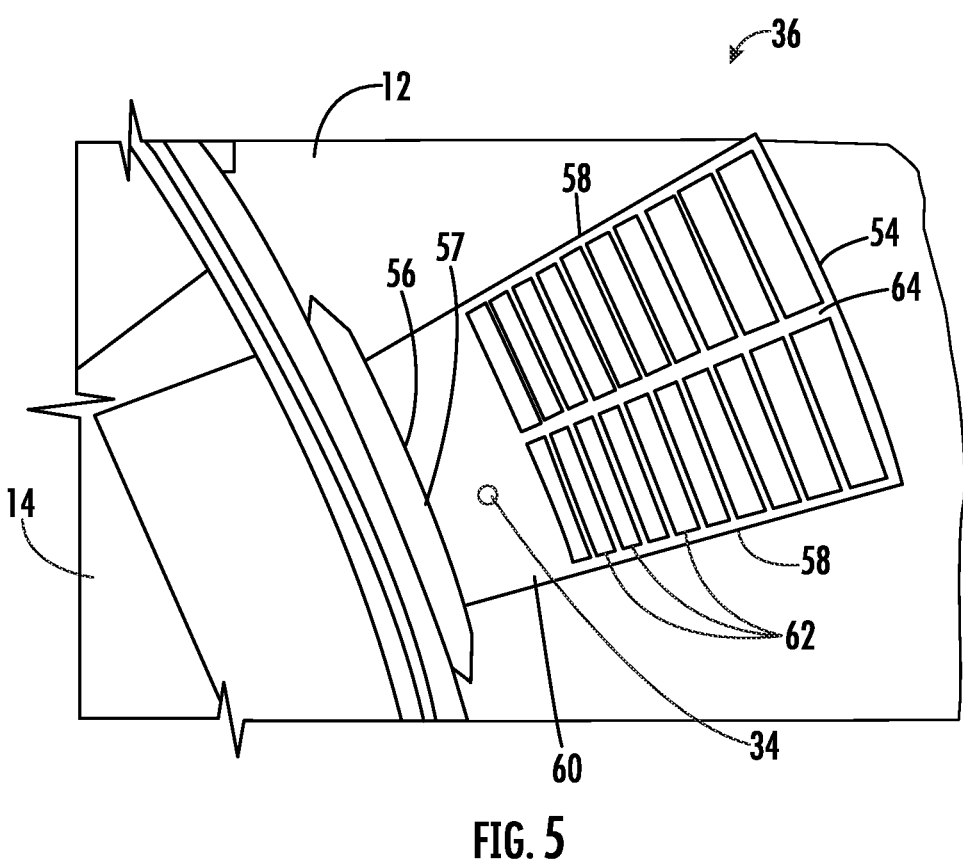
FIG. 5 is a depiction of a plurality of turns of a coil positioned in a stator slot in accordance with another exemplary embodiment of the present disclosure.
Figure 6:
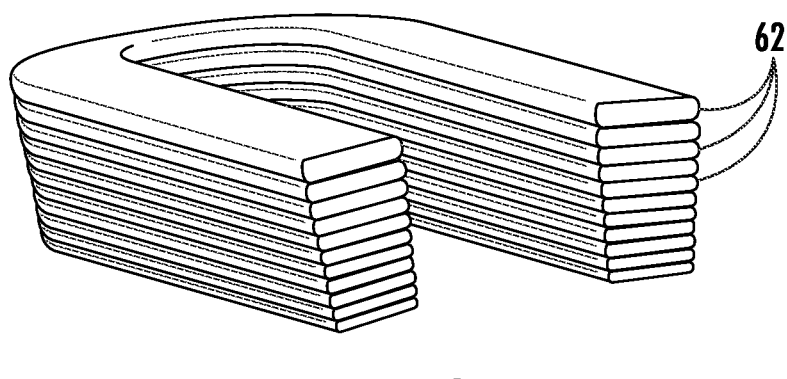
FIG. 6 is a depiction of a plurality of end turns of a coil in accordance with another exemplary embodiment of the present disclosure.

Turning now to FIGS. 5 and 6, an embodiment of the stator 12, stator slot 34, and coil 36 is illustrated. The stator slot 34 is illustrated in FIG. 5 as having a trapezoidal cross-sectional shape. The coil 36 also has a trapezoidal cross-sectional shape and is disposed in the stator slot 34. Turns of the coil 36 have specific shape and relative sizes which are described further below. In one form, the trapezoidal shape of the coil 36 is complementary to the trapezoidal shape of the stator slot 34. A relationship between the shape and relative size of the turns of the coil 36 yields an unexpected reduction in ohmic losses of the windings of the coil 36, thus improving efficiency of the electric machine 10. Instead of utilizing constant height or constant area cross sectional turns of the coil 36 as in prior art devices, it has been discovered that a different relationship yields improved efficiency by taking into account losses including skin effect, circulating currents, and proximity losses. The region in which the instant application achieves favorable results, however, can be defined by several factors including frequency of operation. Numerical ranges of the various factors that influence performance are described further below.

It will be appreciated that although the stator slot 34 and the coil 36 have trapezoidal cross-sectional shapes in the example of FIG. 5, the long side and short side of the trapezoidal cross-sectional shape can be curvilinear in shape in some embodiments. In other embodiments, the long side and short side of the trapezoidal cross-section shape are strictly linear segment typical of a geometric trapezoidal shape. Thus, as used herein, the expression "trapezoidal cross sectional-shape" will be understood to include those shapes having a strict linear shape on all sides of the trapezoid, as well as those shapes which include one or more sides, including the long side and short side, having curvilinear shape. The curvilinear shape can be a circumferential arc having radius of curvature commensurate with a radial distance from the central longitudinal axis, although other radii of curvature are also contemplated.

The trapezoidal shape of the stator slot 34 includes a first end 54 and a second end 56, and sidewalls 58 that extend between the first end 54 and second end 56. As illustrated in the example of FIG. 5, the first end 54 is larger than the second and 56, with sidewalls 58 that taper towards one another at a taper angle 60 as the sidewalls 58 connect the first end 54 to the second end 56. The taper angle 60 is the angle that the sidewall 58 makes relative to a radial line that extends from the central longitudinal axis 16. In the case of the trapezoidal shapes contemplated in some embodiments herein, the taper angle 60 results in a second end 56 that is smaller in circumferential length than the first end 54. In some forms, the first end 54 may be referred to as a distal end of the stator slot 34, and the second and 56 may be referred to as a proximal end of the stator slot 34. Such use of the terms "distal end" and "proximal end" are intended to convey a spatial orientation relative to the rotor 14. The proximal end 56 is the end of the stator slot 34 in proximity to the rotor 14, while the distal end 54 is opposite the proximal end 56 and located at the end of the stator slot 34 furthest from the rotor 14. Stated differently, the "distal end" of the stator slot 34 is radially furthest from the rotor 14, while the "proximal end" of the stator slot 34 is radially closest to the rotor 14.

The proximal end 56 may include an opening between stator teeth 30 that is filled with a wedge 57. The wedge 57 can be any suitable size and dimension useful to close off the opening between the stator teeth 30, and can be made from any suitable material. In some embodiments, the wedge 57 need not be present.

The coil in FIGS. 5 and 6 is depicted as having ten turns and a gap between the coil 36 and the proximal end 56 of the stator slot 34. In some embodiments, it will be appreciated that the coil 36 may have more, or fewer, turns and thus take up more or less space within the stator slot 34. In some embodiments, the gap between the coil 36 and the proximal end 56 of the stator slot 34 may be missing such that the coil 36 occupies the entirety of a radial height between the proximal end 56 and distal end 54 of the stator slot 34. FIG. 6 is a cutaway view depicting end turns of the coil 36, as can be seen by the turns 62. A total of ten (10) turns 62 of the coil 36 are illustrated in FIGS. 5 and 6, although other embodiments may include additional or fewer turns 62.

FIGS. 5 and 6 also depict the curvilinear nature of the sides of the trapezoidal cross-sectional shape.

The turns 62 are solid conductors in the illustrated embodiment which are stacked one upon one another in consecutive order. It is contemplated in many embodiments that only a single turn 62 for a given coil 36 is present at each radial location of the turns, unlike wire wound turns which can include one or more overlapping wire turns at each radial location. In some forms, the turns 62 can comprise a contiguous length of coil 36 from the turn 62 located near the proximal end 56 to the turn 62 located near the distal end 54 of the stator slot 34. The coil 36 can be produced using any suitable technique, including those described above. As a result, the turns 62 can be a monolithic construction such as those that can produced from a casting operation, additive manufacturing operation, and/or machine operation. In some forms, the windings can be roughly made into initial shape by an additive manufacturing or casting operation, and later machined into final form.

The arrangement depicted in FIG. 5 can be referred to as a side-by-side double layer winding and, at least in the illustrated embodiment, includes a space 64 between solid conductors of the turns 62 within the stator slot 34. An example of a single-layer winding and double-layer overlapping winding can be found below in FIGS. 15 and 16, respectively. Note that, in some embodiments, the space 64 depicted in FIG. 5 is relatively constant through the height of the coil 36. This is in contrast to some prior art coils 36 in which the turns 62 have constant cross-sectional area. As will be described further below, the cross sectional-area of the turns 62 in some embodiments contemplated herein will have non-constant cross sectional-area between the turns 62.

FIGS. 5 and 6 also illustrate a relationship of a radial height of each turn 62 relative to the position of the turn 62 between the proximal end 56 and distal end 54. The turn 62 closest to the proximal end 56 has a smaller radial height and/or smaller cross-sectional area than turns 62 that are located radially further from the rotor 14. In some embodiments, a relationship between a turn 62 located closer to the proximal end 56 having a smaller radial height and/or smaller cross-sectional area than a turn 62 located closer to the distal end 54 can apply to all turns 62. For example, in the illustrated embodiment, any turn 62 located radially inward relative to another turn 62 will have a smaller radial height and/or smaller cross-sectional area. Conversely, any turn 62 located radially outward relative to another turn 62 will have a larger radial height and/or larger cross-sectional area. In this sense, the radial height and/or cross-sectional area of each turn 62 of the coil 36 is directly proportional to a radial distance from the rotor 14 such that a turn 62 of the coil at a radial distance furthest from the coil 36 has a radial height and/or cross-sectional area greater than a radial height and/or cross-sectional area of a turn 62 of the coil 36 at a radial distance closest to the rotor 14.

Figure 7:
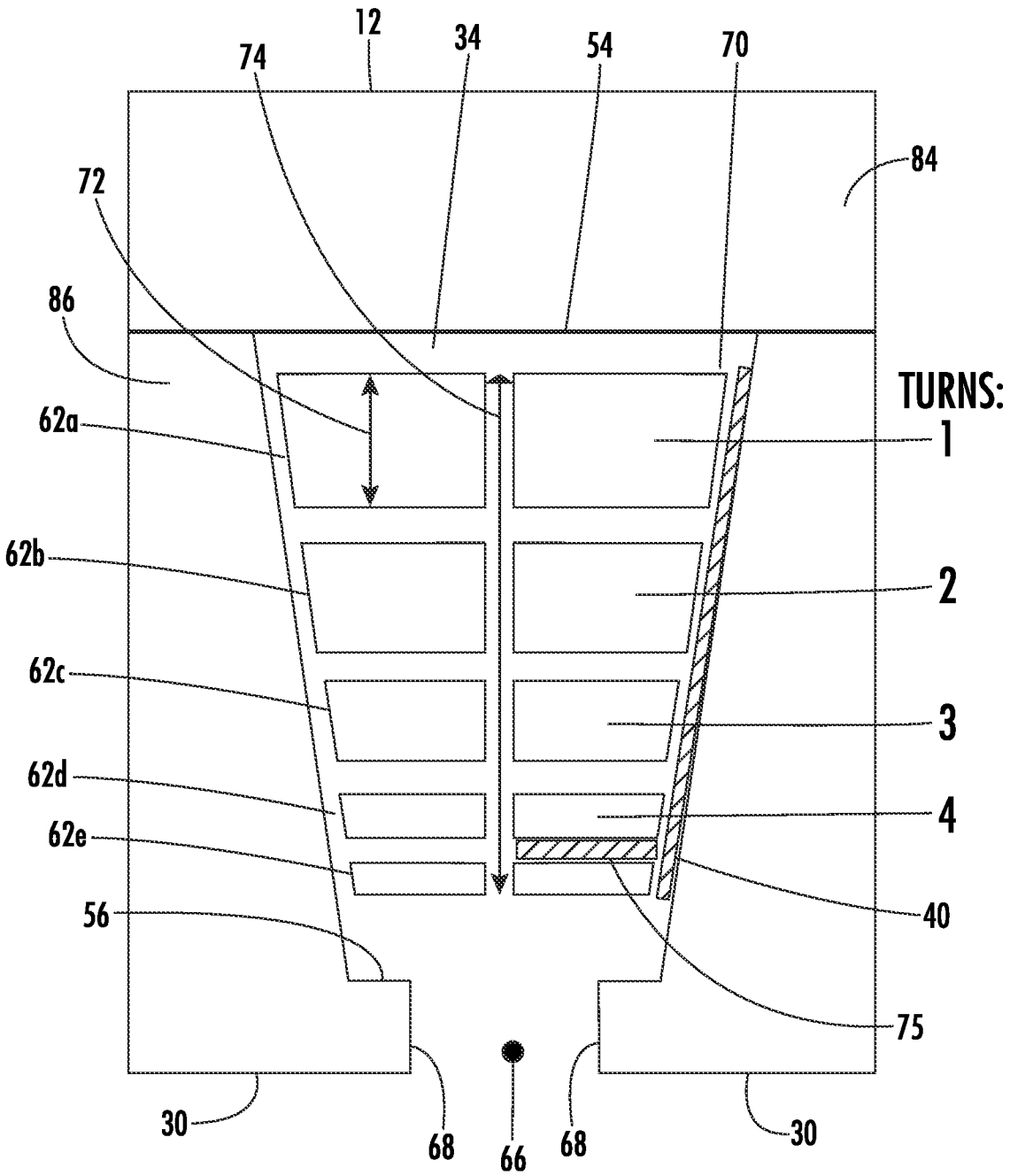
FIG. 7 is a depiction of a plurality of turns of a coil positioned in a stator slot in accordance with another exemplary embodiment of the present disclosure.

FIG. 7 depicts an embodiment of the coil 36 disposed in a slot 34 of the stator 12. A total of five turns 62a-62e are disposed in the slot 34 in FIG. 7. For purposes of description herein, each of the turns in the coil 36 is numbered starting at one (1) starting at the distal end 54 of the slot 34 and continuing to the last turn at the proximal end 56 of the slot 34. Thus, turn 62a corresponds to turn 1, turn 62b corresponds to turn 2, and so on. The embodiment of the slot 34 also includes a slot opening 66 which is formed by extensions 68 of the teeth 30. The slot opening 66 is smaller in size than the proximal end 56.

The cross-sectional shape of each turn of turns 62a-62e can also take the form of a trapezoid, similar to the cross-sectional shape of the slot 34. Further to the above discussion about the distal end and proximal end of the trapezoid being curvilinear, the corners 70 of each turn of the turns 62*a*-62*e* can be rounded, chamfered, or otherwise shaped other than a sharp vertex typical of a geometric trapezoidal shape. The rounded/chamfered/etc. shape of the corners 70 can be the result of a manufacturing operation such as 3-D printing, casting, milling, or post-printing/post-casting final milling operation, etc.

Each of the turns 62*a*-62*e* of the coil 36 are characterized by a turn height ($h_t$) 72, which can be measured in the radial direction and referred to as a radial height, and the entire coil 36 is characterized by a coil height ($h_c$) 74 which can also be measured to in the radial direction. As can be seen in FIG. 7, the turn height 72 of each turn of turns 62*a*-62*e* decreases as the turns progress from the distal end 54 of the slot 34 to the proximal end 56 of the slot. The cross-sectional area of each turn of turns 62*a*-62*e* also decreases as the turns progress from the distal end 54 of the slot 34 to the proximal end 56 of the slot 34. In the embodiment depicted in FIG. 7, each turn of the turns 62*a*-62*e* has a different radial height and a different cross-sectional area relative to an adjacent turn of the turns 62*a*-62*e*. Furthermore, each turn of the turns 62*a*-62*e*, except for the turn of the coil located at the distal end 54 of the slot 34, includes a reduced cross-sectional area and a reduced radial height relative to a turn of the turns 62*a*-62*e* that is located radially outward from each turn of the turns 62*a*-62*e*.

FIG. 7 also depicts that the stator 12 can be segmented, in which a segmented stator includes a first stator segment 84 and second stator segment 86. In the illustrated embodiment, the first stator segment 84 and second stator segment 86 are initially separate segments which are later joined together into an integrated stator 12. Providing a segmented stator in some embodiments allows the coil 36 to be installed into the slot 34, and for the slot 34 to be covered by one part of the segmented stator to enclose the coil 36 in the slot 34. When the first stator segment 84 has an annular ring shape, the first stator segment 84 can be axially slid into place before being coupled with the second stator segment 86. If the first stator segment is itself segmented, the constituent parts of the first stator segment 84 can be coupled to the second stator segment 86 if the constituent parts have an arc length which is, for example, less than half of the circumferential extent of the stator 12. The first stator segment 84 and second stator segment 86 can be affixed to the second stator segment 86 such as by being releasably coupled. In some embodiments, the first segment 84 can be releasably coupled to the second segment 86 through used of screwed fasteners, while in other embodiments the first stator segment 84 and second stator segment 86 can be permanently affixed, such as through metallurgical bonding. Though the stator 12 depicted in FIG. 7 illustrates the first stator segment 84 in the form of the stator base 28, in other embodiments the stator may be segmented at other locations. For example, in one form, the stator 12 may be segmented along a radial direction. In one particular example, the slot 34 can be divided along a part line defined in a radial direction so as to radially split the slot into two. Multiple slots 34 can be split in this manner which, when assembled into a whole, can constitute an annular shape of the stator 12.

In some forms, the turns 62*a*-62*e* can be electrically insulated with ground insulation 40 to separate the turns 62*a*-62*e* from the stator 12, as well as turn insulation disposed between the turns 62*a* to separate each turn of the turns 62*a*-62*e* from each other. In the example of FIG. 7, the ground insulation 40 and turn insulation 75 are depicted in separate single locations, for the sake of convenience, but it will be appreciated that similar ground insulation 40 and turn insulation 75 can be found in analogous locations elsewhere in the embodiment of FIG. 7. Furthermore, the space located between turns of the double layer turn configuration (see, e.g., space 64 in FIG. 6) can be filled with either the ground insulation 40 or turn insulation 75. As a result of discovering the unexpected relationship between turn height 72 and coil height 74, it was determined that ground insulation less than 20 mils and turn insulation less than 10 mils is useful in any given embodiment.

Figure 8:
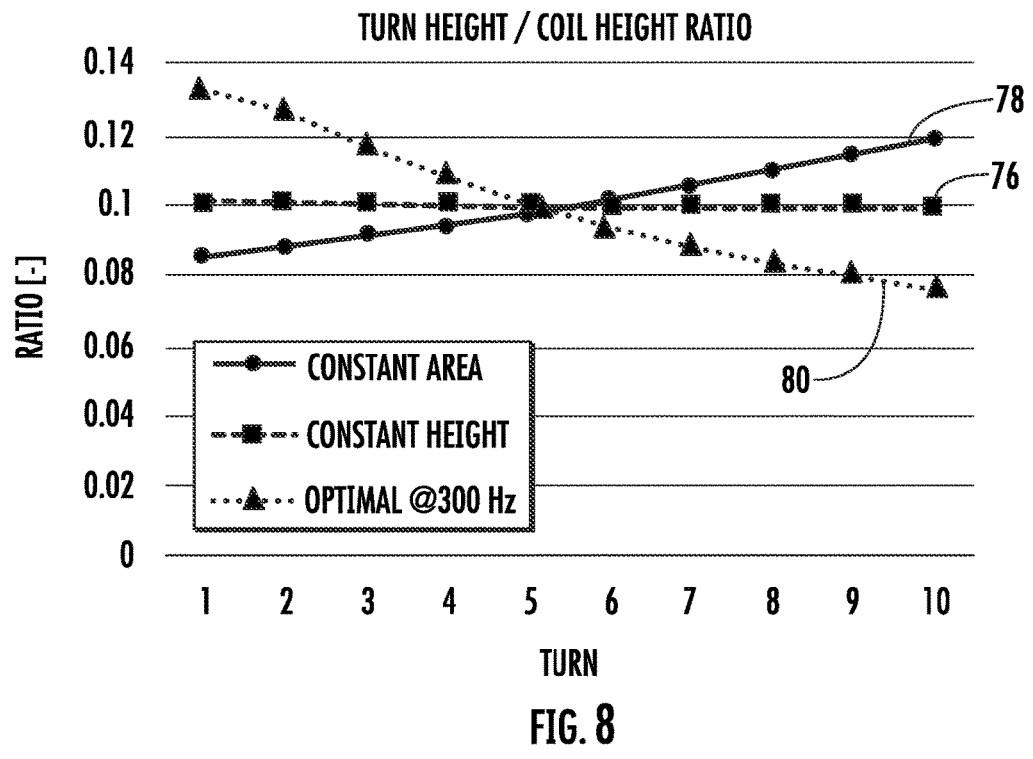
FIG. 8 is a graphical representation of a configuration of a coil in accordance with another exemplary embodiment of the present disclosure relative to prior art devices.

Turning now to FIG. 8, the relationship of turn height to coil height of the instant disclosure can be plotted as a function of the number of turns in the coil, and can thereafter also be plotted against the same relationship of turns 62 of prior art electric machines 10. The y-axis in FIG. 8 corresponds to the ratio $r_{nt} = h_t/h_c$ and the x-axis the number of any given turn 62. As can be immediately noticed, a prior art electric machine 10 having turns 62 with constant height is a straight horizontal line 76 with zero slope. A prior art electric machine 10 having turns with constant area is a line 78 with a positive slope. Since the turns 62 of the instant disclosure decrease height with increasing turn number (see discussion of FIG. 7 above), the electric machine 10 of the instant disclosure exhibits a line 80 with negative slope.

Figure 9:
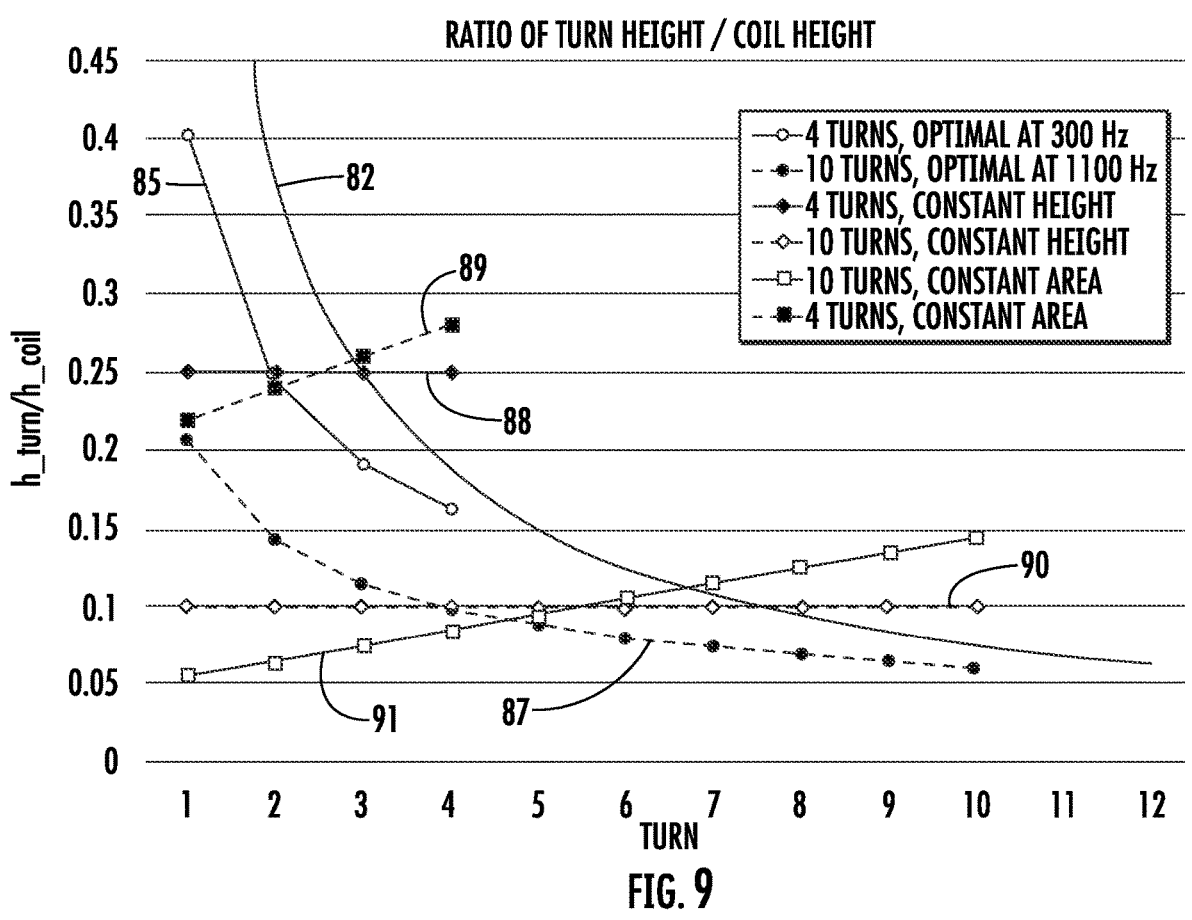
FIG. 9 is a graphical representation of a configuration of a coil in accordance with another exemplary embodiment of the present disclosure relative to prior art devices.

FIG. 9 depicts an unexpected relationship between the ratio $r_{nt}$ and the number of turns for electric machines 10 that exhibit improved performance and for which a larger relationship has been derived. It has been discovered that electric machines 10 having the relationship $$r_{nt} = \frac{h_t}{h_c} \leq \frac{0.75}{n},$$

wherein n is the number of the turn, provide the desired operability and efficiency. Several different arrangements of turns 62 have been evaluated and determined to provide desired characteristics when $$r_{nt} \leq \frac{0.75}{n}.$$

Lines 85 and 87 depict electric machines 10 according to the instant disclosure that satisfy the ratio $r_{nt}$ $$r_{nt} \leq \frac{0.75}{n}$$

over the entirety of the number of turns in the electric machines 10. This relationship is plotted in FIG. 9 as line 82, where electric machines 10 having turns 62 that satisfy the relationship $$r_{nt} \leq \frac{0.75}{n}$$

over all of the turns of the machine 10 reside to the left of line 82, while electric machines 10 that do not satisfy the relationship $$r_{nt} \leq \frac{0.75}{n}$$

have one or more turns that result in a ratio $r_{nt}$ that resides on the right side of line 82. Two prior art devices, indicated as lines 88 and 90, which include turns having constant height, are plotted in FIG. 9 and which include turn numbers that violate the ratio $$r_{nt} \leq \frac{0.75}{n}$$

at the higher turn numbers of those devices. Line 88 has at least turn number 4 that violates the ratio $$r_{nt} \leq \frac{0.75}{n},$$

while line 90 has at least turns 8, 9, and 10 that violate the ratio $$r_{nt} \leq \frac{0.75}{n}.$$

A further two additional prior art devices, indicated as lines 89 and 91, which include turns having constant cross-sectional area, are plotted in FIG. 9 and which include turn numbers that violate the ratio $$r_{nt} \leq \frac{0.75}{n}$$

at the higher turn numbers of those devices. Line 89 has at least turn number 4 that violates the ratio $$r_{nt} \leq \frac{0.75}{n},$$

while line 90 has at least turns 8, 9, and 10 that violate the ratio $r_{nt}$ $$r_{nt} \leq \frac{0.75}{n}.$$

Also evident from the depiction in FIG. 9, lines 85 and 87 of the electric machine 10 of the present disclosure has a decreasing ratio with increasing numbers of turns. Prior art devices of constant radial height have a flat, or zero slope, ratio with increasing numbers of turns. Prior art devices of constant cross-sectional area have an increasing ratio with increasing numbers of turns.

In conjunction with discovering the unexpected relationships discussed above, including the relationship between the ratio $r_{nt}$ and the number of turns for electric machines 10 that exhibit improved performance, and for which the larger relationship above has been derived, it has been discovered that further specifics of the configuration of stator 12 and coil 36 can also lead to improved performance. Although the two embodiments depicted above used ten turns (FIGS. 5 and 6) and five turns (FIG. 7), it has been discovered that improved performance can be realized by using between 4-20 turns per coil. In some embodiments of the stator 12, the same number of turns will be used for all coils 36.

Still further to the above, it is contemplated that the electric machine 10 be operated at a range of alternating current (A/C) frequencies that also improve performance. It is contemplated that the electric machine 10 of the embodiments disclosed herein be operated between 200-2000 Hz.

Figure 10:
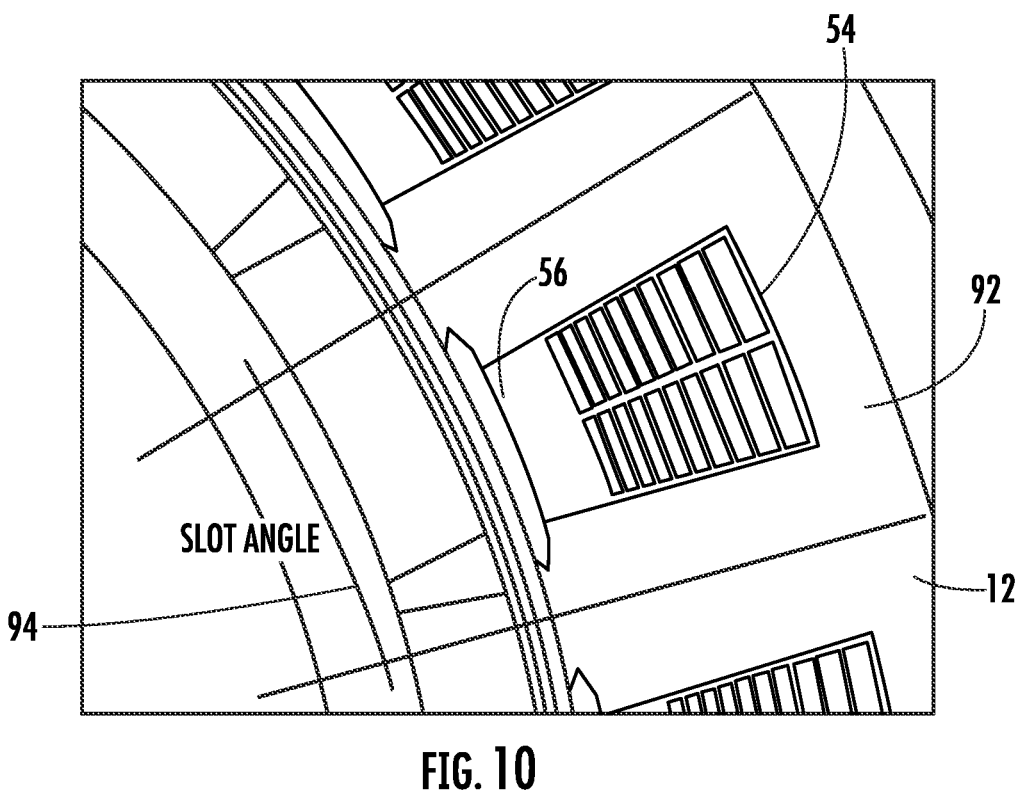
FIG. 10 is a depiction of a plurality of turns of a coil positioned in a stator slot in accordance with another exemplary embodiment of the present disclosure.

Still further aspects can be used to improve the performance of the stator in conjunction with the relationships discovered and discussed above. FIG. 10 depicts a stator 12 having a stator arc slot 92 that is defined by an arc segment as measured from the central longitudinal axis 16. The arc segment can be defined between lines that bisect the space between adjacent stator slots 34. The stator arc slot 92 includes a single slot 34 for use with one or more coils 36 (e.g., a double layer arrangement as depicted above). The arc segment is defined by a slot angle 94 which can be used to determine the total number of slots 34 distributed circumferentially about the stator 12. It is contemplated that slot angles 94 can vary, in any given embodiment of stator 12, anywhere between 5-30 degrees which can produce electric machines 10 with between 12-72 stator arc slots 92.

Figure 11:
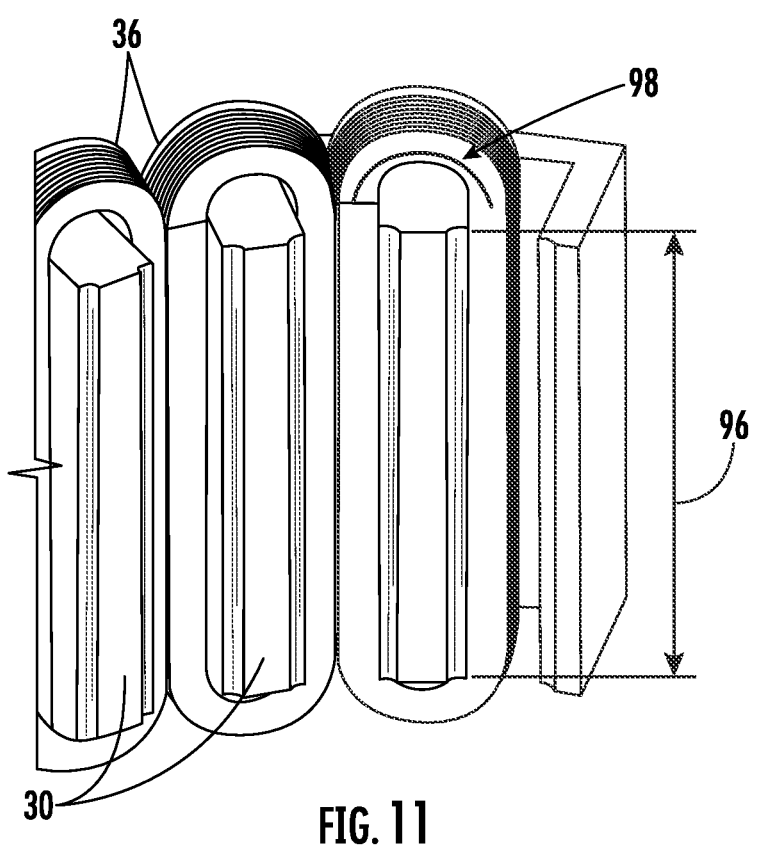
FIG. 11 is a depiction of a coil in a stator in accordance with another exemplary embodiment of the present disclosure.

FIG. 11 depicts a cutaway view of the stator 12 showing other aspects that can be used to improve the performance of the stator in conjunction with the relationships discovered and discussed above. Coils 36 are shown as wrapped around respective stator teeth 30 and in a double stack configuration within a slot 34. The coils 36 extend along an axial length of the teeth 30 prior to forming an end turn that wraps the coil 36 around an end of the teeth 30. The axial distance of the teeth 30 can be referred to as a stack length 96. A length of the end turn, or end length 98, measures the length of the turn as it arcs around the tooth 30. A ratio between the end length 98 and the stack length 96, referred to as an end/stack length ratio, can also be used to further improve the performance of the electric machine. It is contemplated that the end/stack length ratio be between 0.25-1.0.

A table is provided herein which describes the ranges of various features discussed herein that lead to yet further improved performance in some embodiments. It will be appreciated that not all embodiments include a property in one or more of the ranges provided below. Some embodiments of the electric machine 10 that have either (1) each turn of the coil having a different cross-sectional area and a different radial height relative to an adjacent turn of the coil; (2) each turn of the coil except for the turn of the coil located at the distal end of the stator slot includes a reduced radial height relative to a turn of the coil that is located radially outward from each turn of the coil; and/or (3) turns that satisfy the relation $r_{nt}$ discussed above, can include components and operations having properties with values in any of the ranges noted below in Table 1:

TABLE 1

| Variable | Scope |
|---|---|
| Turns | 4-20 turns per coil |
| Frequency | 200-2000 Hz |
| Slot angle | 5-30 degrees |
| End/stack length ratio | 0.25-1.0 |

TABLE 1-continued

| Variable | Scope |
| --- | --- |
| Electrical Conductivity | 0.3-1.0 pu of IACS copper at room temperature, or generally 10 million to 60 million Siemens/meter. |
| Insulation | Ground insulation <20 mils thick; turn insulation <10 mils thick |

Figure 12:
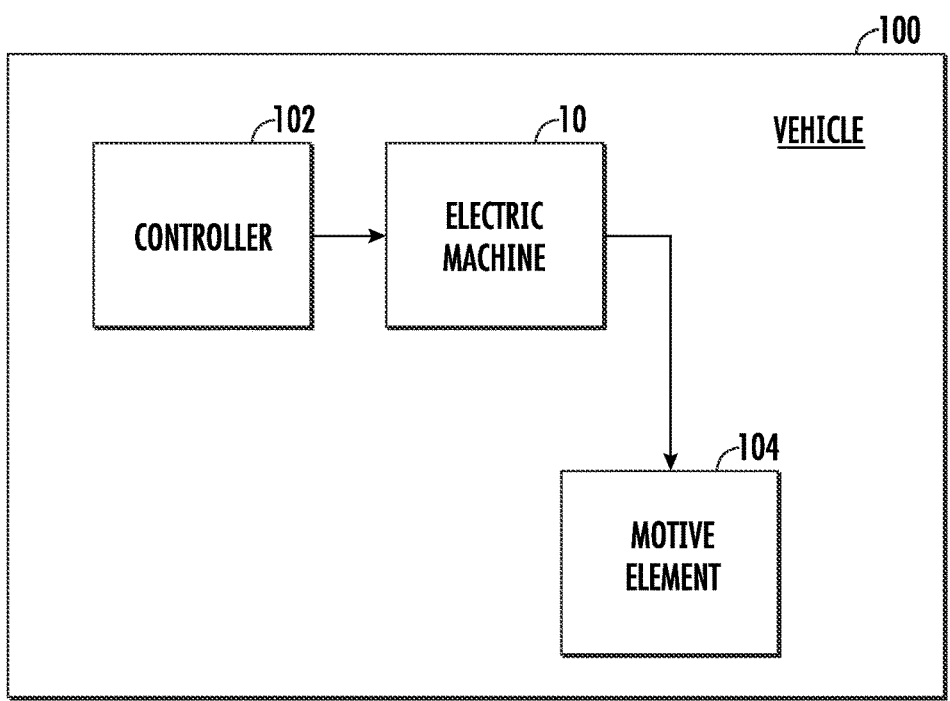
FIG. 12 is a depiction of a vehicle that includes an electric machine in accordance with another exemplary embodiment of the present disclosure.

FIG. 12 depicts an embodiment of a vehicle 100 having any form of the electric machine 10 of the instant disclosure, including variations of the stator 12 and coil 36, capable of being used to exchange electromechanical power with one or more aspects of the vehicle 100. The vehicle 100 further includes a controller 102 useful to regulate the electric machine 10, and a motive element 104 used to exchange the electromechanical power with the electric machine 10. In one form the controller 102 includes power electronics, such as an electric drive, useful to regulate operation of the controller 102. The vehicle 100 can take any variety of forms, including an aircraft, car, truck, tractor, boat, and train, among potential others. The motive element 104 can be a drive shaft, a gas turbine engine shaft (e.g., high pressure shaft, low pressure shaft, etc.), etc. useful to receive power from or deliver power to the electric machine 10. In one particular form, the electric machine 10 is integrated with a hybrid electric power system for use with a gas turbine engine to provide power for an aircraft, land vehicle, or water vessel.

Figure 13:
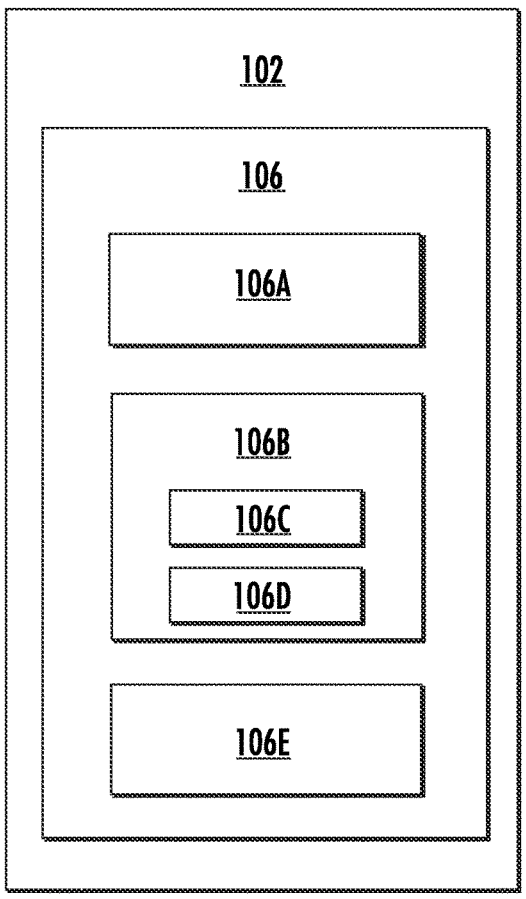
FIG. 13 is a depiction of a computing system in accordance with another exemplary embodiment of the present disclosure.

Turning now to FIG. 13, one or more portions of the controller 102 can be implemented using a computing device 106, one embodiment of which is illustrated in FIG. 5. The computing device(s) 106 can include one or more processor(s) 106A and one or more memory device(s) 106B. The one or more processor(s) 106A can include any suitable processing device, such as a microprocessor, microcontroller, integrated circuit, logic device, and/or other suitable processing device. The one or more memory device(s) 106B can include one or more computer-readable media, including, but not limited to, non-transitory computer-readable media, RAM, ROM, hard drives, flash drives, and/or other memory devices.

The one or more memory device(s) 106B can store information accessible by the one or more processor(s) 106A, including computer-readable instructions 106C that can be executed by the one or more processor(s) 106A. The instructions 106C can be any set of instructions that when executed by the one or more processor(s) 106A, cause the one or more processor(s) 106A to perform operations. In some embodiments, the instructions 106C can be executed by the one or more processor(s) 106A to cause the one or more processor(s) 106A to perform operations, such as any of the operations and functions for which the controller and/or the computing device(s) 106 are configured, the operations for any of the aforementioned systems such as the electric machine 10, etc., as described herein, and/or any other operations or functions of the one or more computing device(s) 106 (e.g., as a full authority digital engine controller). The instructions 106C can be software written in any suitable programming language or can be implemented in hardware. Additionally, and/or alternatively, the instructions 106C can be executed in logically and/or virtually separate threads on the one or more processor(s) 106A. The one or more memory device(s) 106B can further store data 106D that can be accessed by the one or more processor(s) 106A. For example, the data 106D can include data indicative of outside air conditions, power flows, data indicative of engine/vehicle operating conditions, and/or any other data and/or information described herein.

The computing device(s) 106 can also include a network interface 106E used to communicate, for example, with the other components of the systems described herein (e.g., via a communication network). The network interface 106E can include any suitable components for interfacing with one or more network(s), including for example, transmitters, receivers, ports, controllers, antennas, and/or other suitable components. One or more devices can be configured to receive one or more commands from the computing device(s) 106 or provide one or more commands to the computing device(s) 106.

The network interface 106E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

FIG. 14a discloses a method 108a for building an electric machine which includes, at step 109, providing at least a portion of a stator 12 having at least a portion of a stator slot 34. The step of providing the at least a portion of the stator 12 includes any variety of actions including, but not limited to, procuring the at least a portion of the stator 12 such as either through a financial transaction in which the at least a portion of the stator 12 is purchased, or taking physical possession of the at least a portion of the stator 12 that is procured by another. In some forms, the action of providing the at least a portion of the stator 12 refers to a physical action of placing the at least a portion of the stator 12 on a work surface or within enclosure, such as, but not limited to, a work bench or work station. Furthermore, it will be appreciated that the "at least portion" of the stator 12 includes any a full stator 12 as well as any of the segmented stators of the various embodiments discussed herein, including any of stator segments illustrated in FIGS. 17A-17D. Similarly, the "at least portion of" the stator slot 34 includes any of the partial stator slots 34 formed as a result of the stator segments such as those illustrated in FIGS. 17A-17B. Step 110 includes positioning the at least portion of the stator 12 having the at least portion of the stator slot 34 relative to a coil 36, the coil 36 including a plurality of turns 62 stacked upon each other in a radial direction between a proximal end and a distal end of the stator slot 34, each turn 62 of the coil 36 having a different cross-sectional area and a different radial height relative to an adjacent turn 62 of the coil 36. In one form, the stator is a segmented stator that can include a first stator segment 84 and a second stator segment 86. The method 108a can further include a step of directly winding a coil 36 around a tooth 30. For example, the coil can include turns 62 already having a cross sectional shape appropriate for the intended radial position within the slot 34. In another form, the coil 36 having turns 62 formed according to the disclosed embodiments herein can be formed and then assembled to the tooth 30 of a stator segment prior to coupling the stator segment to another stator segment. The coil 36 assembled with turns 62, prior to coupling with another stator segment, can be referred to as an intermediate segment with coils. Numerous intermediate segments with coils can be assembled before being joined together to form a completed stator 12. The intermediate segments can also be used with other methods disclosed herein.

FIG. 14*b* discloses a method 108*b* for building an electric machine which includes, at step 109, providing at least a portion of a stator 12 having at least a portion of a stator slot 34. The step of providing the at least a portion of the stator 12 includes any variety of actions including, but not limited to, procuring the at least a portion of the stator 12 such as either through a financial transaction in which the at least a portion of the stator 12 is purchased, or taking physical possession of the at least a portion of the stator 12 that is procured by another. In some forms, the action of providing the at least a portion of the stator 12 refers to a physical action of placing the at least a portion of the stator 12 on a work surface or within enclosure, such as, but not limited to, a work bench or work station. Furthermore, it will be appreciated that the "at least portion" of the stator 12 includes any a full stator 12 as well as any of the segmented stators of the various embodiments discussed herein, including any of stator segments illustrated in FIGS. 17A-17D. Similarly, the "at least portion of" the stator slot 34 includes any of the partial stator slots 34 formed as a result of the stator segments such as those illustrated in FIGS. 17A-17B. Step 110 includes positioning the at least portion of the stator 12 having the at least portion of the stator slot 34 relative to a coil 36, the coil 36 including a plurality of turns 62 stacked upon each other in a radial direction between a proximal end and a distal end of the stator slot 34, each turn 62 of the coil 36 having a different cross-sectional area and a different radial height relative to an adjacent turn 62 of the coil 36. In one form the stator is a segmented stator that can include a first stator segment 84 and a second stator segment 86. Step 112 includes inserting the coil 36 into the at least portion of the stator slot 34. The insertion of the coil 36 into the slot 34 can be in a radial direction, such as might be expected if the segmented stator were in the form depicted in FIG. 7 where the first stator segment 84 is radially outside of the second stator segment 86. Other embodiments of a segmented stator can include inserting the coil 36 into the slot 34 in a circumferential direction, such as if the stator 12 includes a segment split in the radial direction (e.g., the slot is cut into two in a radial direction). At step 114, the method 108*b* includes that the at least portion of the stator is a first stator segment, and which further includes joining the first stator segment 84 with a second stator segment 86. The step of joining can include moving the stator segment 84 in an axial and/or radial direction to be coupled with the second stator segment 86. For example, if the stator segment 84 is a tooth 30, the ring can be inserted in an axial and/or radial direction to be joined with an annular yoke. If, however, the stator segment 84 includes a plurality of segments that, together, form an annular ring, then the separate segments, if having a small enough arc length (e.g., less than half the circumferential extent of the stator segment 86), can be coupled.

The method 108*b* may additionally include building the coil 36 using additive manufacturing, or making the coil using a cast and molten metal. In some forms the method 108*b* also includes machining the coil either as part of a manufacturing process to rough cut the coil from stock material, and/or as a final form. The method 108*b* can also include affixing the second stator segment to the first stator segment.

Figures 15, 16:
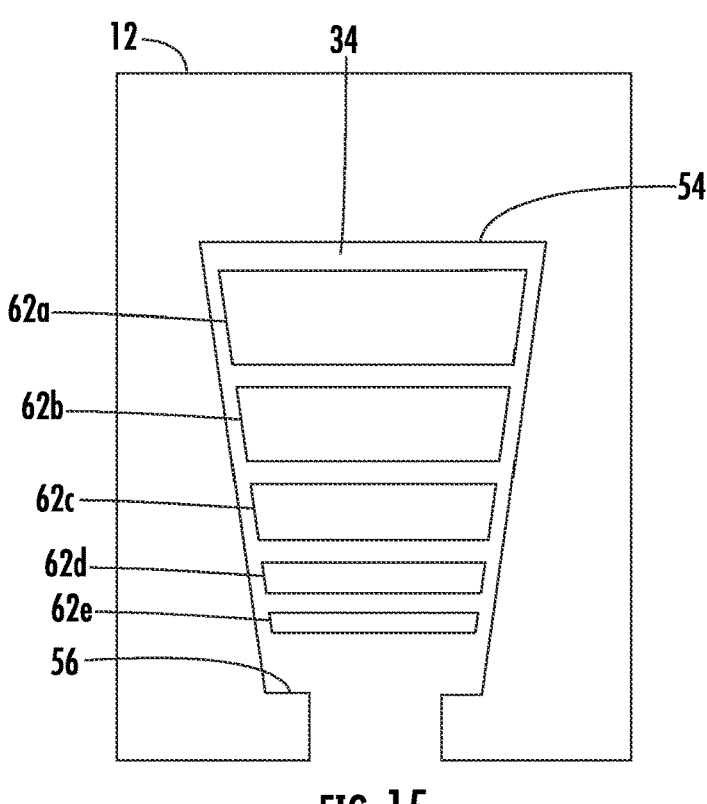
FIG. 15 is a depiction of a plurality of turns of a coil positioned in a stator slot in accordance with another exemplary embodiment of the present disclosure.
FIG. 16 is a depiction of a plurality of turns of a plurality of coils positioned in a stator slot in accordance with another exemplary embodiment of the present disclosure.

Turning now to FIG. 15, the depicted arrangement can be, as mentioned above, referred to as a single-layer winding where turns 62*a*-62*e* from a single coil 36. Any of the embodiments of the stator 12, stator slot 34, and turns 62 mentioned above are applicable to the embodiment depicted in FIG. 15. To set forth just a few nonlimiting examples, the embodiment depicted in FIG. 15 can include turns 62 having the relationship between radial height of a turn 62 with its position between the proximal end 56 and distal end 54, or alternatively, between radial height and a distance of the turn 62 to the rotor 14. Ground insulation 40 and/or turn insulation 75 can also be included. The relative values depicted in Table 1 or described in any of the relationships depicted in FIGS. 8 and 9 are also applicable to the embodiment depicted in FIG. 15.

The arrangement depicted in FIG. 16 can be, as mentioned above, referred to as a top-bottom double-layer overlapping winding where turns 62*a*-62*c* from one coil 36*a* are stacked above and radially overlapping turns 62*d*-62*f* from another coil 36*b*. As with the description above relative to FIG. 15, any of the embodiments of the stator 12, stator slot 34, and turns 62 mentioned above are applicable to the embodiment depicted in FIG. 16. To set forth just a few nonlimiting examples, ground insulation 40 and/or turn insulation 75 can also be included. The relative values depicted in Table 1 or described in any of the relationships depicted in FIGS. 8 and 9 are also applicable to the embodiment depicted in FIG. 16.

With particular respect to the turns 62 depicted in FIG. 16, the turns 62 that are distributed throughout the slot 34 include the relationship described above between radial height and/or cross-sectional area of a turn 62 with its position between the proximal end 56 and distal end 54, or, alternatively, between radial height and/or cross-sectional area and a distance of the turn 62 to the rotor 14. For example, turns 62 located closer to the distal end 54 have greater radial height than turns 62 located closer to the proximal end 56. In some forms, the turns 62 located closer to the distal end 54 also have higher cross-sectional area than turns 62 located closer to the proximal end 56. This relationship between radial height and/or cross-sectional area of any given turn 62 relative to its radial location within the slot 34 can also apply whether the turn 62 is included in the first coil 36*a* or the second coil 36*b*. For example, the turn 62*e* of coil 36*a* located closest to the proximal end 56 can have a larger radial height and/or larger cross-sectional area than the turn 62*c* of coil 36*b* which is located, relative to the other turns 62 in coil 36*b*, closest to the distal end 54 of the slot 34.

Figures 17A, 17B, 17C, 17D:
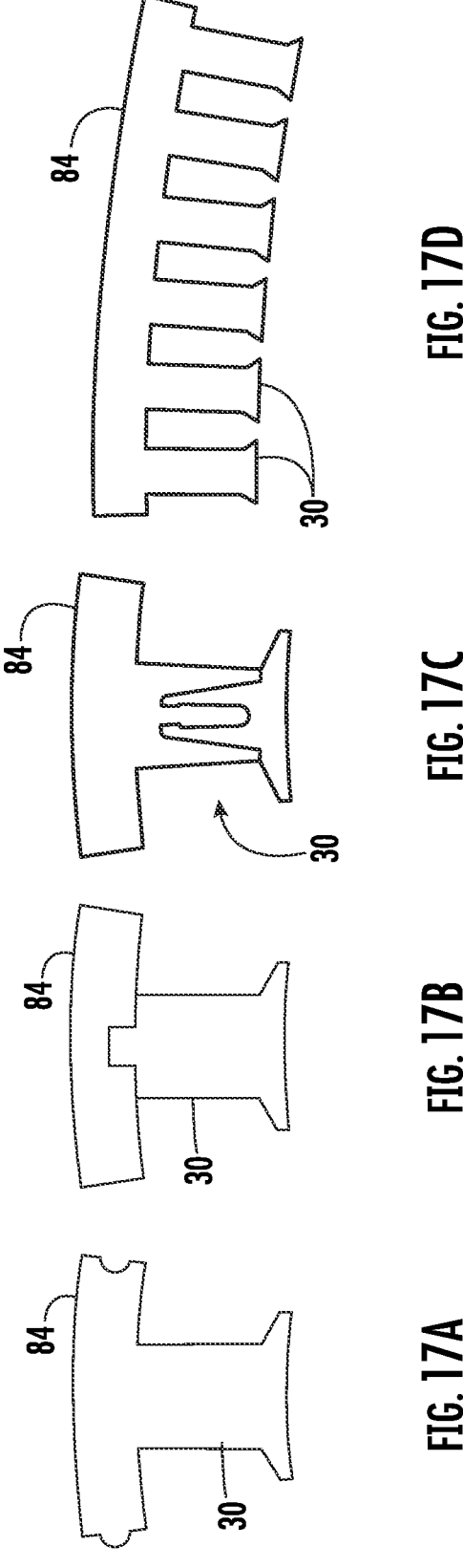
FIG. 17a is a depiction of a stator segment in accordance with another exemplary embodiment of the present disclosure.
FIG. 17b is a depiction of a stator segment in accordance with another exemplary embodiment of the present disclosure.
FIG. 17c is a depiction of a stator segment in accordance with another exemplary embodiment of the present disclosure.
FIG. 17d is a depiction of a stator segment in accordance with another exemplary embodiment of the present disclosure.

Similar to the segmented stator depicted in FIG. 7, FIGS. 11*a*-11*d* depict different embodiments of a first stator segment 84 that can be coupled to a second stator segment (not shown) to form a partial or completed stator 12. FIG. 17*a* depicts a circumferential segment having a single tooth, where the segment can be attached to adjacent stator segments 86 to form an annular stator. FIG. 17*b* depicts a tooth 30 which can be radially and/or axially inserted into an annular yoke. FIG. 17*c* depicts a plug-in pole-shoe associated with the tooth 30. FIG. 17*d* depicts a circumferential segment having a plurality of teeth 30 which can be affixed to similar circumferential segments.

Figure 18:
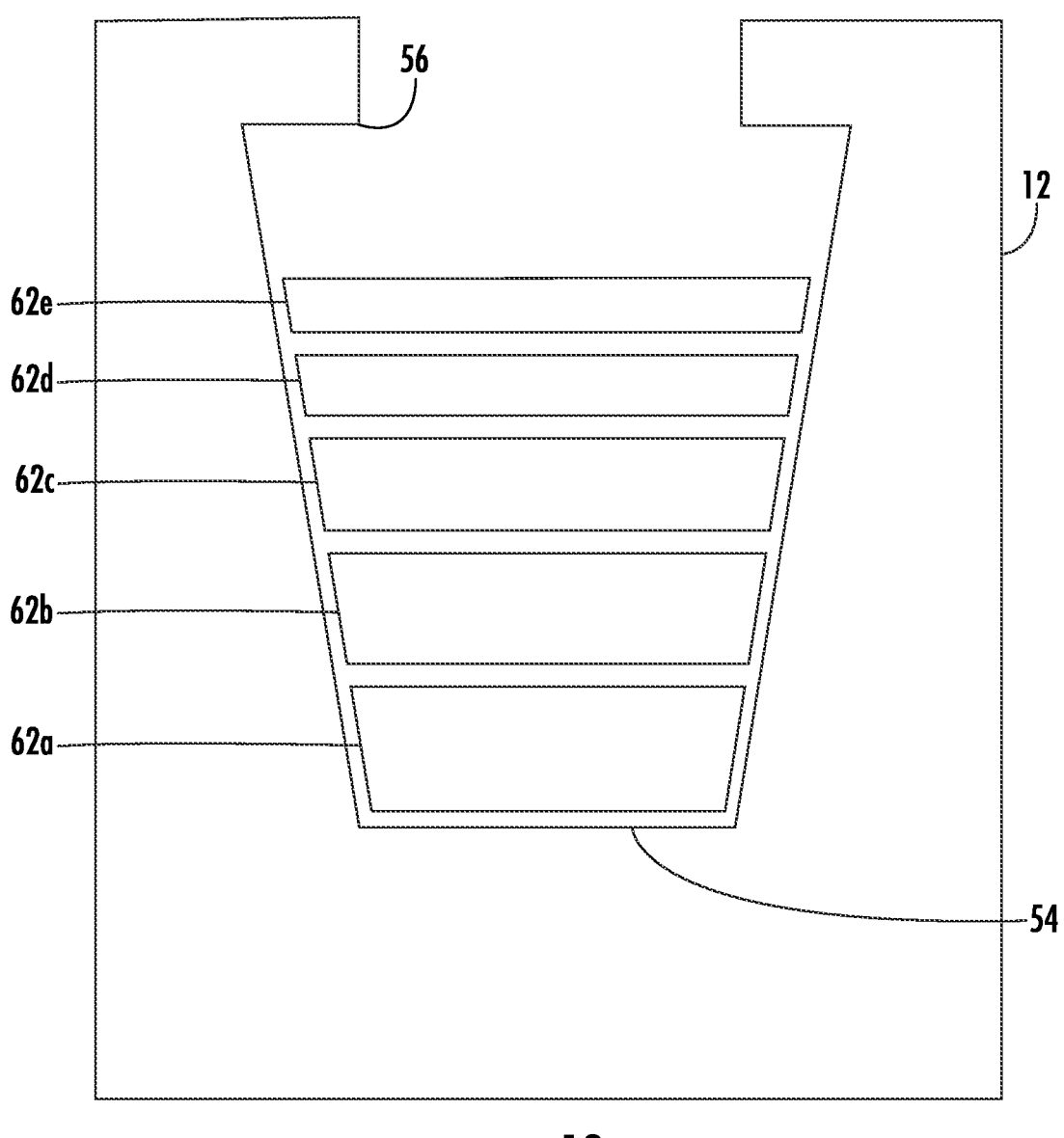
FIG. 18 depicts a portion of a stator configured to be placed radially inward of a rotor such as can be used in the electric machine of FIG. 1b in accordance with another exemplary embodiment of the present disclosure.

FIG. 18 depicts a stator 12 that is placed radially inward of the rotor 14 (not pictured in FIG. 18, but located at the top of the figure nearest the proximal end 56) useful for the configuration depicted in FIG. 1B. The turns 62*a*-62*e* are arranged to provide the relationship of a radial height of each turn 62 relative to the position of the turn 62 between the proximal end 56 and distal end 54. The turn 62 closest to the rotor 14 near the proximal end 56 has a smaller radial height and/or smaller cross-sectional area than turns 62 that are located radially further from the rotor 14. In some embodiments, a relationship between a turn 62 located closer to the proximal end 56 having a smaller radial height and/or smaller cross-sectional area than a turn 62 located closer to the distal end 54 can apply to all turns 62. For example, in the illustrated embodiment of FIG. 18, any turn 62 located radially inward relative to another turn 62 will have a smaller radial height and/or smaller cross-sectional area. Conversely, any turn 62 located radially outward relative to another turn 62 will have a larger radial height and/or larger cross-sectional area. In this sense, the radial height and/or cross-sectional area of each turn 62 of the coil 36 is directly proportional to a radial distance from the rotor 14 such that a turn 62 of the coil at a radial distance furthest from the coil 36 has a radial height and/or cross-sectional area greater than a radial height and/or cross-sectional area of a turn 62 of the coil 36 at a radial distance closest to the rotor 14.

As with the descriptions above relative to FIGS. 15 and 16, any of the embodiments of the stator 12, stator slot 34, and turns 62 mentioned above are applicable to the embodiment depicted in FIG. 18. To set forth just a few nonlimiting examples, ground insulation 40 and/or turn insulation 75 can also be included. The relative values depicted in Table 1 or described in any of the relationships depicted in FIGS. 8 and 9 are also applicable to the embodiment depicted in FIG. 17.

In some embodiments, the coil 36 can include any of the variations of turns 62 mentioned above. In still further embodiments, a number of turns 62 of the coil 36 can have the variations above, with additional turns 62 that are in electrical communication with the number of turns 62 having a different profile. In this context, the coil 36 includes not only a number of turns 62 having any of the variations above, but also the additional turns 62 with different geometry. Referring generally to FIG. 7, the coil 36 can include turns 62a, 62b, and 62c as being in the turns 62 having any of the variations disclosed herein, while the additional turns 62 can include turns 62d and 62e. For example, the number of turns 62 can include any of the variations mentioned above, with the additional turns having a constant cross-sectional area. A yet further example includes the additional turns having constant cross-sectional area but different radial height. Other variations are also contemplated.

A technical benefit of the electric machine 10 is a more efficient transfer of electromechanical power. The coil 36 provides, relative to prior art electric machines, a reduction in ohmic losses over a range of different configurations and operating conditions. In general, ohmic losses can be dependent upon the current density in the windings, where ohmic losses usually have the highest volumetric heat source of the electric machine. In contrast to the solid conductors of the instant disclosure, Litz wire windings suffer from having a low slot filling factor (related to DC loss), which limits the electric loading of the machine due to the current density in the wire strands. Solid conductors shaped to the slot geometry, on the other hand, have a high slot filling factor but are more vulnerable to eddy currents that impact the current density distribution at high frequency (related to AC loss). Any one or more parameters provided in Table 1 provide a better performing and higher efficiency electric machine than those made of Litz wire and operated with the same parameters.

Further aspects are provided by the subject matter of the following clauses:

An electric machine comprising: a stator slot having a distal end and a proximal end arranged along a radial direction wherein the distal end is located radially opposite the proximal end; and a coil disposed in the stator slot, the coil having a plurality of turns stacked upon each other in a radial direction between the proximal end and the distal end of the stator slot, each turn of the coil having a different cross-sectional area and a different radial height relative to an adjacent turn of the coil.

The electric machine of the preceding clause, wherein each turn of the coil except for the turn of the coil located at the distal end of the stator slot includes a reduced cross-sectional area and a reduced radial height relative to a turn of the coil that is located radially outward from each turn of the plurality of turns of the coil.

The electric machine of any preceding clause, wherein the stator slot includes a trapezoidal cross-sectional shape.

The electric machine of any preceding clause, wherein for each turn of the plurality of turns, $$r_{nt} = \frac{h_t}{h_c} \le \frac{0.75}{n},$$

where $r_{nt}$ is a limiting ratio, $h_t$ is the height of the $n^{th}$ turn of the coil, $h_c$ is the height of the coil, and n is the coil number being evaluated in the equation.

The electric machine of any preceding clause, wherein the coil includes at least 4 turns and not more than 20 turns.

The electric machine of any preceding clause, wherein an operating frequency of the coil is between 200 Hz-2000 Hz.

The electric machine of any preceding clause, which further includes a stator having the stator slot, wherein the stator includes a plurality of stator slots having respective stator slot angles, wherein the stator slot is located within a stator arc slot of the plurality of stator slots, wherein each stator arc slot includes a stator slot angle, and wherein the stator slot angle is between 5-30 degrees.

The electric machine of any preceding clause, wherein each turn of the plurality of turns has an end length/stack length ratio between 0.25-1, wherein the end length is an arc length of a given end turn of the plurality of turns, and wherein the stack length is a length between opposing end turns of the plurality of turns.

The electric machine of any preceding clause, wherein the coil comprises a conductive material, and wherein an electrical conductivity of the conductive material is between 0.3-1 pu of International Annealed Copper Standard (IACS) copper at room temperature.

The electric machine of any preceding clause, wherein a ground insulation between the coil and the stator slot has a thickness less than 20 mils, and wherein an insulation between turns of the plurality of turns has a thickness less than 10 mils.

The electric machine of any preceding clause, wherein the coil includes another plurality of turns in electrical communication and stacked with the plurality of turns, each turn of the another plurality of turns having a constant cross sectional area.

The electric machine of the preceding clause, wherein the stator slot is located in a stator, and wherein the stator is a segmented stator.

The electric machine of any preceding clause, which further includes a rotor, the rotor electromagnetically coupled with stator during operation of the electric machine.

The electric machine of any preceding clause, wherein the plurality of turns is in the form of a concentrated winding.

The electric machine of any preceding clause, wherein the plurality of turns is in the form of a distributed winding.

The electric machine of any preceding clause, wherein the proximal end includes a slot opening.

The electric machine of any preceding clause, wherein each of the plurality of windings is trapezoidal in shape.

The electric machine of any preceding clause, wherein the plurality of windings in the stator slot comprise a single layer winding.

The electric machine of any preceding clause, wherein the plurality of windings in the stator slot comprise a double layer winding.

The electric machine of any preceding clause, wherein the stator slot includes a trapezoidal cross-sectional shape, the trapezoidal cross-sectional shape having a distal end and a proximal end and opposing sidewalls that taper toward each other at a taper angle.

The electric machine of any preceding clause, wherein each winding of the plurality of windings is a solid winding, and wherein winding.

The electric machine of any preceding clause, wherein each turn is a solid conductor.

The electric machine of any preceding clause, wherein the distributed windings include hairpin windings.

An electric machine comprising: a rotor configured to rotate about a central longitudinal axis; a stator radially offset from and electromagnetically coupled with the rotor, the stator having: a stator slot having a trapezoidal cross-sectional shape, the trapezoidal cross-sectional shape having a distal end and a proximal end and opposing sidewalls that taper toward each other as the opposing sidewalls extend between the distal end and the proximal end, the distal end of the trapezoidal cross-sectional shape larger than the proximal end; and a coil having a plurality of turns disposed in the stator slot in a radial direction, a radial height of each turn of the coil being directly proportional to a radial distance from the rotor such that a turn of the coil at the radial distance furthest from the coil has a radial height greater than a radial height of a turn of the coil at the radial distance closest to the rotor.

The electric machine of the preceding clause, wherein the stator is a segmented stator.

The electric machine of the preceding clause, wherein the plurality of turns in the form of single-layer windings.

The electric machine of any preceding clause, wherein the plurality of turns is in the form of a concentrated winding.

The electric machine of any preceding clause, wherein the plurality of turns is in the form of a distributed winding.

The electric machine of any preceding clause, wherein the stator slot includes a trapezoidal cross-sectional shape.

The electric machine of any preceding clause, wherein for each turn of the plurality of turns, $$r_{nt} = \frac{h_t}{h_c} \le \frac{0.75}{n},$$

where $r_{nt}$ is a limiting ratio, $h_t$ is the height of the $n^{th}$ turn of the coil, $h_c$ is the height of the coil, and n is the coil number being evaluated in the equation.

The electric machine of any preceding clause, wherein the coil includes at least 4 turns and not more than 20 turns.

The electric machine of any preceding clause, wherein an operating frequency of the coil is between 200 Hz-2000 Hz.

The electric machine of any preceding clause, which further includes a stator having the stator slot, wherein the stator includes a plurality of stator slots having respective stator slot angles, wherein the stator slot is located within a stator arc slot of the plurality of stator slots, wherein each stator arc slot includes a stator slot angle, and wherein the stator slot angle is between 5-30 degrees.

The electric machine of any preceding clause, wherein each turn of the plurality of turns has an end length/stack length ratio between 0.25-1, wherein the end length is an arc length of a given end turn of the plurality of turns, and wherein the stack length is a length between opposing end turns of the plurality of turns.

The electric machine of any preceding clause, wherein the coil comprises a conductive material, and wherein an electrical conductivity of the conductive material is between 0.3-1 pu of the International Annealed Copper Standard copper at room temperature.

The electric machine of any preceding clause, wherein a ground insulation between the coil and the stator slot has a thickness less than 20 mils, and wherein an insulation between turns of the plurality of turns has a thickness less than 10 mils.

The electric machine of any preceding clause, wherein the proximal end includes a slot opening.

The electric machine of any preceding clause, wherein each of the plurality of windings is trapezoidal in shape.

The electric machine of any preceding clause, wherein the plurality of windings in the stator slot comprises a single layer winding.

The electric machine of any preceding clause, wherein the plurality of windings in the stator slot comprises a double layer winding.

The electric machine of any preceding clause, wherein the stator slot includes a trapezoidal cross-sectional shape, the trapezoidal cross-sectional shape having a distal end and a proximal end and opposing sidewalls that taper toward each other at a taper angle.

The electric machine of any preceding clause, wherein each winding of the plurality of windings is a solid winding, and wherein winding.

The electric machine of any preceding clause, wherein each turn is a solid conductor.

The electric machine of any preceding clause, wherein the distributed windings include hairpin windings.

A method of building an electric machine comprising: providing at least a portion of a stator having at least a portion of a stator slot; and positioning a the at least portion of the stator having the at least portion of the stator slot relative to a coil, the coil including a plurality of turns stacked upon each other in a radial direction between a proximal end and a distal end of the stator slot, each turn of the coil having a different cross-sectional area and a different radial height relative to an adjacent turn of the coil.

The method of the preceding clause, which further includes inserting the coil into the at least a portion of the stator slot.

The method of any preceding clause, wherein the at least portion of the stator slot is a first stator segment, and which further includes joining the first stator segment with a second stator segment.

The method of any preceding clause, which further includes at least one of building the coil using additive manufacturing, making the coil using a cast and molten metal, or machining the coil.

The method of any preceding clause, which further includes affixing the second stator segment to the first stator segment.

A method of building an electric machine comprising: positioning a first stator segment having a stator slot relative to a coil, the coil including a plurality of turns stacked upon each other in a radial direction between a proximal end and a distal end of the stator slot, each turn of the coil having a different cross-sectional area and a different radial height relative to an adjacent turn of the coil; inserting the coil into the stator slot; and joining the first stator segment with a second stator segment.

An electric machine comprising: a rotor configured to rotate about a central longitudinal axis; a stator radially offset from and electromagnetically coupled with the rotor, the stator having a stator slot; a coil having a means for reducing ohmic losses.

The electric machine of the preceding clause, wherein the means for reducing ohmic losses includes a solid conductor having a shape profile configured to reduce ohmic losses.

The electric machine of any of the preceding clauses, wherein the means for reducing ohmic losses includes a solid conductor having a shape profile configured to reduce ohmic losses.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An electric machine comprising:
a stator slot having a distal end and a proximal end arranged along a radial direction, wherein the distal end is located radially opposite the proximal end; and
a coil disposed in the stator slot, the coil having a plurality of turns stacked upon each other in a radial direction between the proximal end and the distal end of the stator slot, each turn of the coil having a different cross-sectional area and a different radial height relative to an adjacent turn of the coil,
where in each turn of the coil except for the turn of the coil located at the distal end of the stator slot includes a reduced cross-sectional area and a reduced radial height relative to a turn of the coil that is located radially outward from each turn of the plurality of turns of the coil.

2. The electric machine of claim 1, wherein the stator slot includes a trapezoidal cross-sectional shape.

3. The electric machine of claim 1, wherein, for each turn of the plurality of turns, $$r_{nt} = \frac{h_t}{h_c} \le \frac{0.75}{n},$$

where $r_{nt}$ is a limiting ratio, $h_t$ is a height of an $n^{th}$ turn of the coil as counted from a first turn (n=1) of the coil located at the distal end of the stator slot, $h_c$ is the height of the coil, and n is a coil number being evaluated.

4. The electric machine of claim 1, wherein the coil includes at least 4 turns and not more than 20 turns.

5. The electric machine of claim 1, wherein an operating frequency of the coil is between 200 Hz-2000 Hz.

6. The electric machine of claim 1, which further includes a stator having the stator slot, wherein the stator includes a plurality of stator slots having respective stator slot angles, wherein the stator slot is located within a stator arc slot of the plurality of stator slots, wherein each stator arc slot includes a stator slot angle, and wherein the stator slot angle is between 5-30 degrees.

7. The electric machine of claim 1, wherein each turn of the plurality of turns has an end length/stack length ratio between 0.25-1, wherein the end length is an arc length of a given end turn of the plurality of turns, and wherein the stack length is a length between opposing end turns of the plurality of turns.

8. The electric machine of claim 1, wherein the coil comprises a conductive material, and wherein an electrical conductivity of the conductive material is between 0.3-1 percentage unit of International Annealed Copper Standard (IACS) copper at room temperature.

9. The electric machine of claim 1, wherein a ground insulation between the coil and the stator slot has a thickness less than 20 mils, and wherein an insulation between turns of the plurality of turns has a thickness less than 10 mils.

10. The electric machine of claim 1, wherein the coil includes another plurality of turns in electrical communication and stacked with the plurality of turns, each turn of the another plurality of turns having a constant cross sectional area.

11. An electric machine comprising:
a rotor configured to rotate about a central longitudinal axis;
a stator radially offset from and electromagnetically coupled with the rotor, the stator having:
a stator slot having a trapezoidal cross-sectional shape, the trapezoidal cross-sectional shape having a distal end and a proximal end and opposing sidewalls that taper toward each other as the opposing sidewalls extend between the distal end and the proximal end, the distal end of the trapezoidal cross-sectional shape radially further from the rotor than the proximal end; and
a coil having a plurality of turns disposed in the stator slot in a radial direction, a radial height of each turn of the coil being directly proportional to a radial distance from the rotor such that a turn of the coil at the radial distance furthest from the coil has a radial height greater than a radial height of a turn of the coil at the radial distance closest to the rotor, each turn of the coil having a different cross-sectional area relative to an adjacent turn of the coil, wherein each turn of the coil except for the turn of the coil located at the distal end of the stator slot includes a reduced cross-sectional area relative to a turn of the coil that is located radially outward from each turn of the plurality of turns of the coil.

12. The electric machine of claim 11, wherein the stator is a segmented stator.

13. The electric machine of claim 11, wherein the plurality of turns in a form of single-layer windings.

14. The electric machine of claim 11, wherein the plurality of turns is in a form of a concentrated winding.

15. The electric machine of claim 11, wherein the plurality of turns is in a form of a distributed winding.

16. A method of building an electric machine comprising:

providing at least a portion of a stator having at least a portion of a stator slot; and positioning the at least portion of the stator having the at least portion of the stator slot relative to a coil, the coil including a plurality of turns stacked upon each other in a radial direction between a proximal end and a distal end of the stator slot, each turn of the coil having a different cross-sectional area and a different radial height relative to an adjacent turn of the coil, where in each turn of the coil except for the turn of the coil located at the distal end of the stator slot includes a reduced cross-sectional area and a reduced radial height relative to a turn of the coil that is located radially outward from each turn of the plurality of turns of the coil.

17. The method of claim 16, which further includes inserting the coil into the at least a portion of the stator slot.

18. The method of claim 16, wherein the at least portion of the stator slot is a first stator segment, and which further includes joining the first stator segment with a second stator segment.

19. The method of claim 16, which further includes at least one of building the coil using additive manufacturing, making the coil using a cast and molten metal, or machining the coil.

* * * * *